(12) United States Patent
Bermundo

(10) Patent No.: US 10,282,605 B2
(45) Date of Patent: May 7, 2019

(54) PRINT DATA SEMANTIC ANALYZER

(71) Applicant: KYOCERA Document Solutions Inc., Osaka (JP)

(72) Inventor: Neil-Paul Bermundo, Glendora, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/282,811

(22) Filed: Sep. 30, 2016

(65) Prior Publication Data

US 2018/0096201 A1 Apr. 5, 2018

(51) Int. Cl.
*G06K 9/00* (2006.01)
*G06K 9/72* (2006.01)
*H04N 1/00* (2006.01)
*H04N 1/44* (2006.01)
*G06F 3/12* (2006.01)

(52) U.S. Cl.
CPC ....... *G06K 9/00456* (2013.01); *G06F 3/1222* (2013.01); *G06F 3/1238* (2013.01); *G06F 3/1248* (2013.01); *G06F 3/1285* (2013.01); *G06K 9/726* (2013.01); *H04N 1/00344* (2013.01); *H04N 1/4493* (2013.01); *G06K 2009/00489* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 5,978,563 | A * | 11/1999 | Kawamoto | G06K 15/02 358/1.1 |
| 7,292,375 | B2 | 11/2007 | Nishida | |
| 2011/0067100 | A1* | 3/2011 | Fukuoh | G03G 15/55 726/21 |
| 2015/0071542 | A1* | 3/2015 | Dahl | G06K 9/00852 382/177 |
| 2016/0004779 | A1* | 1/2016 | Sathish | G06F 17/30864 707/771 |
| 2016/0378999 | A1* | 12/2016 | Panchapakesan | G06F 21/6254 726/26 |

* cited by examiner

*Primary Examiner* — Lennin R Rodriguezgonzalez
(74) *Attorney, Agent, or Firm* — JTT Patent Services, LLC; Gerald T. Peters

(57) ABSTRACT

A print data semantic analysis system may comprise a print data handler and a database. The print data handler may include a semantic analyzer and a computer. The semantic analyzer may include a semantic identifier and a semantic operator. Semantic pattern(s), rule(s), and/or semantic category or categories may be stored in mutually associated fashion at the database. The print data handler may be a printer driver having a page description language (PDL) generator. The print data handler may be a raster image processor (RIP), a print server, or a printer having a PDL interpreter. The database may take the form of source code, function(s), lookup or other such table(s), and/or any other suitable format(s). The database may be a function table containing function(s) incorporating the semantic pattern(s), rule(s), and/or semantic category or categories.

20 Claims, 24 Drawing Sheets

PROJECT: INTERLOCK
IMPORTANT: This document is for internal use only.

This document describes a very important product known only to a few people.

This is the next, biggest product that will ever be launched by the company.

The code name for this new product is "Interlock".

Interlock is a new kind of technology that will solve a problem on printer engines, which is paper jam.

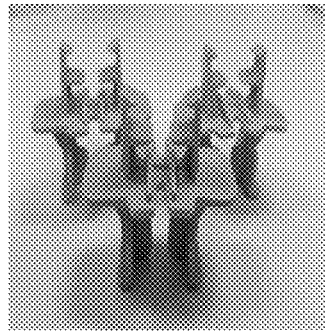

There will be no more paper jams ever because of Interlock.

Interlock will solve this problem using the following methods:

1. Use of flat document mat
2. Elimination of rolling and bending of paper
3. Use of dry, nonstick toner that does not require heat
4. Always cool drum and rollers The paper to be used on this printer will also not be rolled but will remain flat on a document mat that slides out when paper is completely printed on.

Interlock project will launch in 1 year.

The following departments will be involved:

1. RIP Team
2. Engine Team
3. PMO
4. Hardware ASIC team

FIG. 5

PROJECT: ███████
IMPORTANT: This document is for internal use only.

This document describes a very important product known only to a few people.

This is the next, biggest product that will ever be launched by the company.

The code name for this new product is "███████".

███████ is a new kind of technology that will solve a problem on ███████ engines, which is ███████.

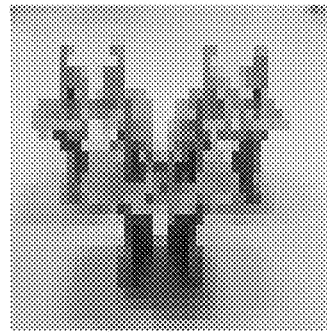

There will be no more ███████ ever because of ███████.

███████ will solve this problem using the following methods:

1. Use of ███████
2. Elimination of ███████ and ███████ of paper
3. Use of dry, ███████ that does not require heat
4. Always ███████ and ███████

The paper to be used on this ███████ will also not be ███ed but will remain flat on a ███████ that slides out when paper is completely printed on.

███████ project will launch in 1 year.

The following departments will be involved:

1. ███████ Team
2. ███████ Team
3. ███████
4. ███████ team

FIG. 6

PROJECT: ~~INTERLOCK~~
IMPORTANT: This document is for internal use only.

This document describes a very important product known only to a few people.

This is the next, biggest product that will ever be launched by the company.

The code name for this new product is "~~Interlock~~".

~~Interlock~~ is a new kind of technology that will solve a problem on ~~printer~~ engines, which is ~~paper jam~~.

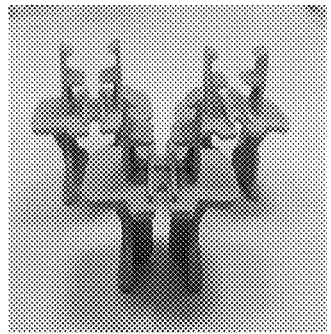

There will be no more ~~paper jams~~ ever because of ~~Interlock~~.

~~Interlock~~ will solve this problem using the following methods:

1. Use of ~~flat document mat~~
2. Elimination of ~~rolling~~ and ~~bending~~ of paper
3. Use of dry, ~~nonstick toner~~ that does not require heat
4. Always ~~cool drum~~ and ~~rollers~~

The paper to be used on this ~~printer~~ will also not be ~~rolled~~ but will remain flat on a ~~document mat~~ that slides out when paper is completely printed on.

~~Interlock~~ project will launch in 1 year.

The following departments will be involved:

1. ~~RIP~~ Team
2. ~~Engine~~ Team
3. ~~PMO~~
4. ~~Hardware ASIC~~ team

FIG. 7

CENSOR REPORT

| | |
|---|---|
| User login: | jdoe |
| User: | John Doe |
| Timestamp: | July 15, 2016 3:50pm |
| IP address: | 192.168.1.1 |
| Printer: | Censor Printer |
| Job Name: | doc201607151550.docx |

Censor Job Log:

| LOCATION | MARKED OBJECT | INSTANCE COUNT |
|---|---|---|
| Page 1 | INTERLOCK | 1 |
| Page 1 | Interlock | 5 |
| Page 1 | printer | 2 |
| Page 1 | paper jam | 2 |
| Page 1 | flat document mat | 1 |
| Page 1 | rolling | 1 |
| Page 1 | bending | 1 |
| Page 1 | nonstick toner | 1 |
| Page 1 | cool drum | 1 |
| Page 1 | rollers | 1 |
| Page 1 | roll | 1 |
| Page 1 | RIP | 1 |
| Page 1 | Engine | 1 |
| Page 1 | PMO | 1 |
| Page 1 | Hardware ASIC | 1 |

FIG. 8

```xml
<FixedPage Width="816" Height="1056"
xmlns="http://schemas.microsoft.com/xps/2005/06" xml:lang="und">

<!-- Microsoft XPS Document Converter (MXDC) Generated! Version: 0.3.7601.17514 -->

<Glyphs Fill="#ff2e74b5" FontUri="/Documents/1/Resources/Fonts/3145D081-6A97-
4DE4-BDDE-009C5C388D30.odttf" FontRenderingEmSize="21.2397"
StyleSimulations="None" OriginX="96" OriginY="132.16"
Indices="87;90,54;75,65;58,32;28;18,53;100,49;855;3,22;47;69,65;100;28;90;62;75;18;60,
52;3" UnicodeString="PROJECT: INTERLOCK " />

<Glyphs Fill="#ff000000" FontUri="/Documents/1/Resources/Fonts/6E77CFF3-64E0-
414C-A66D-6351E1B52724.odttf" FontRenderingEmSize="14.6921"
StyleSimulations="None" OriginX="96" OriginY="153.92"
Indices="47;68;87;75;90;100;4;69,64;100,48;855;3;100;346;349;400;3;282,52;381;272,43;
437,51;373;286,49;374;410;3;349;400;3;296;381;396;3;349;374,52;410;286;396;374;258;3
67;3;437,52;400;286,49;3,22;381,54;374,52;367;455;856,24;3"
UnicodeString="IMPORTANT: This document is for internal use only. " />

<Glyphs Fill="#ff000000" FontUri="/Documents/1/Resources/Fonts/6E77CFF3-64E0-
414C-A66D-6351E1B52724.odttf" FontRenderingEmSize="14.6921"
StyleSimulations="None" OriginX="96" OriginY="183.84"
Indices="100;346,52;349;400,40;3,22;282;381;272,43;437,51;373,81;286;374,52;410,33;3;
282,52;286,51;400;272;396;349;271,52;286,49;400;3;258;3,22;448;286;396,34;455,46;3;3
49,22;373,81;393,52;381;396;410;258;374,52;410,33;3;393;396;381;282;437;272,41;410;3
;364;374,52;381;449;374;3,22;381,54;374,52;367;455,46;3,21;410;381;3;258;3;296;286,49
;449;3;393;286,49;381,54;393,52;367;286;856,24;3" UnicodeString="This document
describes a very important product known only to a few people. " />

<Glyphs Fill="#ff000000" FontUri="/Documents/1/Resources/Fonts/6E77CFF3-64E0-
414C-A66D-6351E1B52724.odttf" FontRenderingEmSize="14.6921"
StyleSimulations="None" OriginX="96" OriginY="213.76"
Indices="100;346,52;349;400,40;3,22;349;400;3;410;346;286,49;3;374;286;454;410,33;85
3;3;271;349;336;336;286;400;410,32;3;393;396;381,52;282;437,52;272,43;410;3;410;346;
258;410;3,22;449;349;367;367;3;286,49;448,46;286;396,34;3;271,52;286;3;367;24;258;43
7,52;374,52;272,41;346;286;282;3;271,52;455,46;3;410;346;286,49;3;272;381;373,81;393,
52;258;374,51;455,46;856,24;3" UnicodeString="This is the next, biggest product that will
ever be launched by the company. " />
```

FIG. 13A

<Glyphs Fill="#ff000000" FontUri="/Documents/1/Resources/Fonts/6E77CFF3-64E0-414C-A66D-6351E1B52724.odttf" FontRenderingEmSize="14.6921" StyleSimulations="None" OriginX="96" OriginY="243.84" Indices="100;346,52;286,51;3,22;272;381;282,52;286;3;374;258,47;373,81;286,49;3;296,30;381,54;396,34;3,22;410;346;349;400;3;374;286,49;449;3;393;396;381;282;437;272;410,33;3;349;400;3,22;862;47;374,52;410;286;396;367,22;381,54;272;364,44;863,43;856,24;3" UnicodeString="The code name for this new product is "Interlock". " />

<Glyphs Fill="#ff000000" FontUri="/Documents/1/Resources/Fonts/6E77CFF3-64E0-414C-A66D-6351E1B52724.odttf" FontRenderingEmSize="14.6921" StyleSimulations="None" OriginX="96" OriginY="273.76" Indices="47;374,52;410;286;396;367;381,54;272,41;364;3;349;400,40;3,22;258,47;3;374;286;449,71;3;364;349;374;282,52;3,22;381;296;3;410,33;286,51;272;346,52;374,52;381,54;367,21;381,54;336;455;3;410;346,52;258,47;410;3;449,73;349,22;367;367,22;3;400,40;381;367,22;448,46;286,49;3,22;258;3,22;393,52;396;381,54;271,52;367;286;373;3" UnicodeString="Interlock is a new kind of technology that will solve a problem " />

<Glyphs Fill="#ff000000" FontUri="/Documents/1/Resources/Fonts/6E77CFF3-64E0-414C-A66D-6351E1B52724.odttf" FontRenderingEmSize="14.6921" StyleSimulations="None" OriginX="96" OriginY="293.12" Indices="381;374;3;393;396;349;374,52;410;286;396;3,22;286;374;336;349;374,52;286;400;853;3,22;449;346;349;272;346,52;3;349,22;400;3;393;258;393,52;286;396;3;361,25;258,46;373,81;856,24;3" UnicodeString="on printer engines, which is paper jam. " />

<Glyphs Fill="#ff000000" FontUri="/Documents/1/Resources/Fonts/6E77CFF3-64E0-414C-A66D-6351E1B52724.odttf" FontRenderingEmSize="14.6921" StyleSimulations="None" OriginX="96" OriginY="323.2" Indices="100;346,52;286,51;396,34;286;3,22;449;349,24;367,22;367;3;271;286;3;374,52;381;3,22;373;381;396;286;3;393;258;393,51;286;396;3;361,25;258,46;373,81;400;3;286,49;448,46;286;396,34;3;271,52;286,51;272;258;437,52;400,38;286;3,22;381;296;3;47,26;374,52;410,33;286;396;367;381;272;364,45;856;3" UnicodeString="There will be no more paper jams ever because of Interlock. " />

FIG. 13B

<Glyphs Fill="#ff000000" FontUri="/Documents/1/Resources/Fonts/6E77CFF3-64E0-414C-A66D-6351E1B52724.odttf" FontRenderingEmSize="14.6921" StyleSimulations="None" OriginX="96" OriginY="353.12" Indices="47;374,52;410;286;396;367;381,54;272,41;364;3;449;349,24;367,22;367,22;3;40 0,40;381;367,22;448,46;286,49;3;410;346,52;349;400;3;393;396,34;381,52;271,52;367;28 6;373,81;3;437;400;349;374,52;336;3;410;346,51;286,51;3,22;296,30;381;367;367;381,52; 449;349,24;374,52;336;3;22;373;286;410;346;381;282;400,38;855,26;3" UnicodeString="Interlock will solve this problem using the following methods: " />

<Glyphs Fill="#ff000000" FontUri="/Documents/1/Resources/Fonts/6E77CFF3-64E0-414C-A66D-6351E1B52724.odttf" FontRenderingEmSize="14.6921" StyleSimulations="None" OriginX="120" OriginY="383.04" Indices="1005;856" UnicodeString="1." />

<Glyphs Fill="#ff000000" FontUri="/Documents/1/Resources/Fonts/30FCF64D-BEE1-48D1-B7BF-22ED0CDFF112.odttf" FontRenderingEmSize="14.6921" StyleSimulations="None" OriginX="131.2" OriginY="383.04" Indices="3" UnicodeString=" " />

<Glyphs Fill="#ff000000" FontUri="/Documents/1/Resources/Fonts/6E77CFF3-64E0-414C-A66D-6351E1B52724.odttf" FontRenderingEmSize="14.6921" StyleSimulations="None" OriginX="144" OriginY="383.04" Indices="104;400;286;3;22;381;296;3;296;367;258;410,33;3;282;381;272,43;437,51;373,8 1;286;374,52;410,33;3;373;258,47;410,33;3" UnicodeString="Use of flat document mat " />

<Glyphs Fill="#ff000000" FontUri="/Documents/1/Resources/Fonts/6E77CFF3-64E0-414C-A66D-6351E1B52724.odttf" FontRenderingEmSize="14.6921" StyleSimulations="None" OriginX="120" OriginY="402.4" Indices="1006;856" UnicodeString="2." />

<Glyphs Fill="#ff000000" FontUri="/Documents/1/Resources/Fonts/30FCF64D-BEE1-48D1-B7BF-22ED0CDFF112.odttf" FontRenderingEmSize="14.6921" StyleSimulations="None" OriginX="131.2" OriginY="402.4" Indices="3" UnicodeString=" "

FIG. 13C

// Disassembler Input File Name = W:\Ideas\Censor Feature\InterlockXL.prn string* "!R!SEM6;EXIT;"
string* "\x1B%-12345X"   // Universal End-Of-Language
string* "@PJL JOB NAME=\"Interlock.docx 090616 103703836\"\r\n"
string* "@PJL SET TIMEOUT=300 \r\n"
string* "@PJL SET RESOLUTION=600\r\n"
string* "@PJL SET BITSPERPIXEL=4 \r\n"
string* "@PJL COMMENT=\"INFO:NUP 1; DUPLEX OFF; QTY 1; COLORMODE MONO;\"\r\n"
string* "@PJL COMMENT=\"APP:C:\\Windows\\splwow64.exe;\"\r\n"
string* "@PJL SET ECONOMODE=OFF \r\n"
string* "@PJL SET USERNAME=\"neil\"\r\n"
string* "@PJL SET JOBNAME=\"Interlock.docx 090616 103703836\"\r\n"
string* "@PJL SET QTY=1\r\n"
string* "@PJL SET KPAGESPERSHEET=1 \r\n"
string* "@PJL ENTER LANGUAGE=PCLXL \r\n"

. . .

sint16_xy 1034 727 Point
// Operator Position: 44
SetCursor ubyte_array "INTERLOCK" TextData
ubyte_array [ 32 86 64 65 71 56 88 71 0 ]
XSpacingData
// Operator Position: 45
Text

. . .

sint16_xy 1991 1425 Point
// Operator Position: 125
SetCursor ubyte_array "Interlock" TextData
ubyte_array [ 23 48 31 46 32 20 49 39 0 ]
XSpacingData
// Operator Position: 126
Text

FIG. 15A ubyte_array "1" FontName
// Operator Position: 127
BeginChar

. . .

sint16_xy 501 1921 Point
// Operator Position: 147
SetCursor ubyte_array "There will be no more paper jams ever because of " TextData
ubyte_array [
45 48 46 32 46 20 66 21 21 21 21 48 46 21 47 49
20 73 49 32 46 21 48 44 47 46 32 21 22 43 74 36
21 45 42 46 31 21 48 46 39 44 48 35 46 20 49 28
0
]
XSpacingData
// Operator Position: 148
Text

. . .

sint16_xy 801 2295 Point
// Operator Position: 171
SetCursor ubyte_array "Use of flat document ma" TextData
ubyte_array [
59 36 46 20 49 28 21 28 21 44 30 21 48 49 39 47
74 46 48 30 21 73 0
]
XSpacingData
// Operator Position: 172
Text sint16_xy 1723 2295 Point
// Operator Position: 173
SetCursor ubyte_array "t" TextData
// Operator Position: 174
Text

FIG. 15B

PCL Dump v1.2.1 - Peerless Systems Corporation - 1999

Dumping PRN file: InterlockPCL5.prn

```
000000  Printable
        "!R!SEM6;EXIT;"
00000D  Exit Language / Start PJL              Esc%-12345X
000016  Printable
        "@PJL JOB NAME="Interlock.docx 090616 105908"<CR><LF>
        @PJL SET DUPLEX=OFF <CR><LF>
        @PJL SET TIMEOUT=300 <CR><LF>
        @PJL SET RESOLUTION=600<CR><LF>
        @PJL SET BITSPERPIXEL=1 <CR><LF>
        @PJL COMMENT="INFO:NUP 1; DUPLEX OFF; COPY
        1; COLORMODE MONO;"<CR><LF>
        @PJL
COMMENT="APP:C:\Windows\system32\PrintIsolationHost.exe;"<CR><LF>
        @PJL SET ECONOMODE=OFF <CR><LF>
        @PJL SET USERNAME="neil"<CR><LF>
        @PJL SET JOBNAME="Interlock.docx 090616 105908"<CR><LF>
        @PJL SET KPAGESPERSHEET=1 <CR><LF>
        @PJL ENTER LANGUAGE=PCL <CR><LF>

. . .

00E83B  Move CAP Vertical   (863 Dots)         863Y
00E83F  Printable
        "[80]*"
00E841  Move CAP Horizontal (1735 Dots)          Esc*p1735x
00E849  Move CAP Vertical   (863 Dots)         863Y
00E84D  Printable
        "[80],"
00E84F  Move CAP Horizontal (1756 Dots)          Esc*p1756x
00E857  Move CAP Vertical   (863 Dots)         863Y
00E85B  Printable
        "[80]4"
00E85D  Move CAP Horizontal (1804 Dots)          Esc*p1804x
00E865  Move CAP Vertical   (863 Dots)         863Y
00E869  Printable
        "[80]5"
```

FIG. 17A

```
00E86B  Move CAP Horizontal (1835 Dots)        Esc*p1835x
00E873  Move CAP Vertical   (863 Dots)         863Y
00E877  Printable
        "[80]3"
00E879  Move CAP Horizontal (1881 Dots)        Esc*p1881x
00E881  Move CAP Vertical   (863 Dots)         863Y
00E885  Printable
        "[80]7"
00E887  Move CAP Horizontal (1913 Dots)        Esc*p1913x
00E88F  Move CAP Vertical   (863 Dots)         863Y
00E893  Printable
        "[80]4"

. . .

00F0DD  Move CAP Vertical   (1050 Dots)        1050Y
00F0E2  Printable
        "[80]."
00F0E4  Move CAP Horizontal (668 Dots)         Esc*p668x
00F0EB  Move CAP Vertical   (1050 Dots)        1050Y
00F0F0  Printable
        "[80]/"
00F0F2  Move CAP Horizontal (717 Dots)         Esc*p717x
00F0F9  Move CAP Vertical   (1050 Dots)        1050Y
00F0FE  Printable
        "[80]0"
00F100  Move CAP Horizontal (756 Dots)         Esc*p756x
00F107  Move CAP Vertical   (1050 Dots)        1050Y
00F10C  Printable
        "[80]1"
00F10E  Move CAP Horizontal (803 Dots)         Esc*p803x
00F115  Move CAP Vertical   (1050 Dots)        1050Y
00F11A  Printable
        "[80]2"
```

```
. . .
@PJL SET KPAGESPERSHEET=1
@PJL ENTER LANGUAGE=POSTSCRIPT
M%!PS-Adobe-3.0
%%Title: Interlock.docx 090616 110331
%%Creator: Kyocera FS-6030MFP KX
%%CreationDate: 09/06/2016 11:03:31.364
%%DocumentPrinterRequired: Kyocera FS-6030MFP KX
%%For: neil
%%BoundingBox: (atend)
%%Pages: (atend)
%%Orientation: (atend)
%%PageOrder: Special
%%DocumentNeededResources: (atend)
%%DocumentSuppliedResources: (atend)
%%DocumentData: Clean7Bit
%%LanguageLevel: 3
%%KcCopies: 1
%%EndComments
%%BeginDefaults
%%PageOrientation: Portrait
%%PageBoundingBox: 12.00 8.00 600.00 784.00
%%PageMedia: (Plain)
%%EndDefaults
%%BeginProlog
%%BeginResource: Macro_Basic
/KPDLBASE 100 dict dup begin
/d/def load def/l/load load d/a/add 1 d/al/aload 1 d/Q/array 1 d/`/begin 1 d/b
/bind 1 d/q/cleartomark 1 d/C/closepath 1 d/+/concat 1 d/c/copy 1 d/cd
/currentdict 1 d/cf/currentfile 1 d/cm/currentmatrix 1 d/~/curveto 1 d/cN/cvn 1
d/c$/cvs 1 d/dfK/definefont 1 d/#/dict 1 d/@/dup 1 d/e/exec 1 d/E/end 1 d/O
/eofill 1 d/ex/exch 1 d/f/false 1 d/F/fill 1 d/ft/filter 1 d/ff/findfont 1 d/*
. . .
```

FIG. 19A

```
cleartomark
0.00 setgray
2383 1954 M
mark
<0114151317190F101F>
[23 48 30 46 32 21 49 38 0]xshow
cleartomark
0.00 setgray
2712 1954 M
mark
<1B>
show
cleartomark
0.00 setgray
2735 1954 M
mark
<0A>
show
cleartomark
0.00 setgray
501 2141 M
mark
<0114151317190F101F>
[23 48 31 46 32 21 49 38 0]xshow
cleartomark
0.00 setgray
831 2141 M
mark
<0A>
show
cleartomark
0.00 setgray
852 2141 M
mark
<200C19190A0D0F191D130A150B0C0D0A1E170F1C1913120A110D0C14230A150B13
0A160F19190F200C14230A1213150B0F0E0D09>
[66 21 21 20 21 36 49 20 42 45 21 31 48 21 36 21 48 31 48 48 21 46 74 21 48 36 21 48 43
21 31 47 46 21 27 49 21 21 48 66 21 48 43 21 73 46 31 48 49 48 35 0]xshow
cleartomark
0.00 setgray
2789 2141 M
mark
```

FIG. 19B

```
<0A>
show
cleartomark
0.00 setgray
cf eexec
9E67EDC6
B856320C94E4AD8269AF835A1F8FE5CCF5D69D3899CD261AE9D16838A8816D7CA
0
25F17FB2E89EE883A996BA
BBB0780AB7ABF766975CD1499E8A7D88F342BFB596B66E8756225E2B90E968EC95
1CE5DB9F2402
971387BACBC190DA6AA703680A395BA8FC76CA809B518B5C7146451EC2A7124E8
E134EDDE20211
32CA67C70366CA89157E683BCE2A648CD0C3F6FF2F165A98C3F1270945BAAEA16
DBE6500319076
CF16050465AA6EE3259DF88DBE8016D51B0C0F7DEC7B4373F195CB8F6E0FA9C18
188903579B501
C3476F03DAEB9CA69DF6E7CB7EAEC228133978FDF4F977794408C98D055A91874E
F3DF573CB3E6
3CE7426E23E55EE19A11C09EB0BDF6000E2A2A9EDDC9F699D29C78954E598D8F2
13995452EDAF9
4E5F37066A2F593FD09BE425D8D8841928
B4134960B9D6AF3F3B5001D3451F0E533D
0000000000000000000000000000000000000000000000000000000000000000
0000000000000000000000000000000000000000000000000000000000000000
0000000000000000000000000000000000000000000000000000000000000000
0000000000000000000000000000000000000000000000000000000000000000
0000000000000000000000000000000000000000000000000000000000000000
0000000000000000000000000000000000000000000000000000000000000000
0000000000000000000000000000000000000000000000000000000000000000
0000000000000000000000000000000000000000000000000000000000000000
q
651 2328 M
mark
<271B>
[47 0]xshow
cleartomark
```

FIG. 19C

PRINT DATA SEMANTIC ANALYZER

FIELD OF THE INVENTION

The present invention relates to semantic analysis of print data; i.e., data in any of various stages of preparation for printing. In particular, the present invention relates to methods, systems, and devices for censoring and/or filtering print data based on semantic content thereof.

BACKGROUND

Wherever information is conveyed to an audience, there may be a desire to analyze the semantic content of that information.

Such analysis of semantic content might be carried out in comparatively passive and/or after-the-fact fashion. For example, semantic content might be analyzed with the goal of monitoring and/or reporting, as is the case with the "word clouds" that are featured in the sidebars of various web-based blogs and that display the relative frequency with which various words appear in some already-published material.

There is also a need for active and/or before-the-fact analysis of semantic content. Especially where it is practical to analyze the semantic content of information before, or even in real time as, that information is conveyed to its audience, ability to filter, censor, or otherwise modify that information based on recognizable semantic patterns therewithin would be useful in a wide variety of circumstances.

An individual, or a public or private organization, that conveys, or is responsible for others who may convey, information in various forms to various audiences will generally have concerns regarding, and may even have a duty to monitor or control, the semantic content of such information based on issues of legality, secrecy, confidentiality, privacy, accuracy, and/or any of various legally mandated and/or self-imposed standards such as those of political correctness or based on other codes of proper conduct or appropriate behavior, violation of which could in some situations cause considerable embarrassment, loss, or other harm to befall that individual or organization.

For example, universities might wish to prevent illegal or improper distribution of copyrighted or controversial material. Corporations might wish to prevent inadvertent disclosure of proprietary information. Governmental organizations might wish to ensure that politically incorrect language is avoided in any literature disseminated by that organization.

Where an individual or organization does not possess the resources with which to manually edit or proofread all of the many forms of information emanating from that individual or organization, that individual or organization may therefore be exposed to considerable risk.

Or even where an individual or organization may possess resources capable of performing such manual editing or proofreading in situations where there is adequate time between the time that the information is created and the time that this information is conveyed to its audience, such manual editing or proofreading may be inadequate during live or near-live communication of information, where there may be little or no delay between the time that the information is created and the time that this information is conveyed to its audience.

There is therefore a need for ability to automatically analyze, filter, and/or censor information based on the semantic content of that information, and it would be desirable if such automatic analysis, filtering, and/or censoring could be carried out in more or less real time, so that such analysis, filtering, and/or censoring might not cause introduction of excessive delay between the time that the information is created and the time that this information is conveyed to its audience.

It would also facilitate implementation of such semantic analysis capability if it could be integrated or combined with existing functionality for parsing, interpreting, and/or converting the content of such information, as might typically be the case during preparation of a print job by a printer driver and/or during preparation of a raster image by a raster image processor (RIP), for example.

SUMMARY OF INVENTION

A print data handler in accordance with an embodiment of the present invention may comprise a computer and a semantic analyzer.

The semantic analyzer may have a semantic identifier and a semantic operator.

The semantic analyzer may be communicatively connected to a database. Within the database, there may be at least one semantic pattern stored in association with at least one rule.

During processing of print data by the print data handler, the semantic analyzer may carry out semantic analysis of the print data by causing the semantic identifier to recognize the at least one semantic pattern in the print data. The semantic analyzer may further cause the semantic operator to carry out at least one operation according to the at least one rule in correspondence to the at least one semantic pattern when the semantic identifier recognizes the at least one semantic pattern in the print data.

In one embodiment, at least one category may be stored in association with the at least one semantic pattern within the database. During processing of print data by the print data handler, the semantic analyzer might be further capable of carrying out the semantic analysis of the print data in correspondence to the at least one category when the semantic analyzer recognizes the at least one semantic pattern in the print data.

In some embodiments, the print data handler may be a printer driver capable of creating a print job. The printer driver may have a page description language generator. The semantic analyzer may be capable of carrying out the semantic analysis of the print data in conjunction with parsing of the print data by the page description language generator.

In one embodiment, the database may be a function table. In such an embodiment, during creation of the print job by the printer driver, the semantic analyzer might be capable of causing the page description language generator to employ at least one function stored at the function table in correspondence to the at least one semantic pattern when the semantic analyzer recognizes the at least one semantic pattern in the print data.

During processing of print data by the print data handler, the semantic identifier might recognize not only at least one perfect match but also at least one near-match of the at least one semantic pattern in the print data.

The print data might be encoded so as to be at least partially unintelligible to a human being.

At least a portion of the database might be present within the print data.

In one embodiment, the at least one operation carried out by the semantic analyzer may be at least one species selected from among the group consisting of counting of a number of occurrences of the at least one semantic pattern in the print data, colored highlighting of the at least one semantic pattern in the print data, application of at least one hatch pattern to the at least one semantic pattern in the print data, blurring of the at least one semantic pattern in the print data, replacement of the at least one semantic pattern in the print data, striking of the at least one semantic pattern in the print data, crossing out of the at least one semantic pattern in the print data, blackening of the at least one semantic pattern in the print data, and obscuring of the at least one semantic pattern in the print data.

In some embodiments, the print data handler may be a printer capable of creating a raster image.

In some embodiments, the printer may have a page description language interpreter.

In some embodiments, the semantic analyzer may be capable of carrying out the semantic analysis of the print data in conjunction with parsing of the print data by the page description language interpreter.

In one embodiment, the database may be a function table. In such an embodiment, during creation of the raster image by the printer, the semantic analyzer might be capable of causing the page description language interpreter to employ at least one function stored at the function table in correspondence to the at least one semantic pattern when the semantic analyzer recognizes the at least one semantic pattern in the print data.

In some embodiments, the printer might be a multifunction peripheral that includes functionality of at least one species selected from among the group consisting of image scanner, facsimile machine, copy machine, and document storage device.

In some embodiments, the printer may be a raster image processor.

In some embodiments, the printer may be a print server.

A print data semantic analysis system in accordance with an embodiment may comprise a print data handler as described above.

The print data handler may include a computer, a semantic analyzer, and a database as described above.

The database may be communicatively connected to the print data handler.

In one embodiment, there might be a first print data handler and a second print data handler.

The first print data handler might be a printer driver capable of creating a print job The second print data handler might be a printer capable of creating a raster image.

A print data semantic analysis method in accordance with an embodiment of the present invention may comprise carrying out semantic analysis of print data.

The semantic analysis of the print data might be carried out by causing a print data handler to recognize at least one semantic pattern in the print data.

The semantic analysis of the print data might be carried out by further causing the print data handler to carry out at least one operation according to at least one rule in correspondence to the at least one semantic pattern when the at least one semantic pattern is recognized in the print data.

A database may be communicatively connected to the print data handler.

Within the database there may be at least one semantic pattern that is stored in association with the at least one rule.

As described above, some embodiments of the present invention may make it possible to carry out automatic and/or real-time analysis, filtering, and/or censoring of information based on semantic content, and may conveniently and efficiently carry out such analysis, filtering, and/or censoring in conjunction with preparation of a print job by a printer driver and/or preparation of a raster image by a raster image processor (RIP) at a printer.

Other embodiments, systems, methods, features, and advantages of the present invention will be apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. In the drawings, like reference numerals designate corresponding parts throughout the several views.

FIG. 5 is an example of unanalyzed print data 172 which might be subjected to analysis by semantic analyzer 120 at print data handler 110 in print data semantic analysis system 100 shown in FIG. 1.

FIG. 6 is one example of analyzed print data 174 that might result when the unanalyzed print data 172 of FIG. 5 is subjected to analysis by semantic analyzer 120 at print data handler 110 in print data semantic analysis system 100 shown in FIG. 1.

FIG. 7 is another example of analyzed print data 174 that might result when the unanalyzed print data 172 of FIG. 5 is subjected to analysis by semantic analyzer 120 at print data handler 110 in print data semantic analysis system 100 shown in FIG. 1; in a variation, the four hatch patterns respectively indicating matches for different semantic categories at FIG. 7 might be replaced with four colors respectively indicating same.

FIG. 8 is an example of a report 176 that might result when the unanalyzed print data 172 of FIG. 5 is subjected to analysis by semantic analyzer 120 at print data handler 110 in print data semantic analysis system 100 shown in FIG. 1.

FIGS. 13A through 13C show an example of print data that might be subjected to semantic analysis by semantic analyzer 120, 220, 320, the unanalyzed print data 172, 272, 372 shown in FIGS. 13A through 13C being an example of print data in the form of XPS print data such as might be used in one or more embodiments for printing of the document shown in FIG. 5.

FIGS. 15A and 15B show content of print instructions such as might be obtained when the encoded PCL XL instructions shown in FIG. 14 are decoded.

FIGS. 17A and 17B show content of print instructions such as might be obtained when the encoded PCL 5 instructions shown in FIG. 16 are decoded.

FIG. 18 shows an example of print data that might be subjected to semantic analysis by semantic analyzer 120, 220, 320, the unanalyzed print data 172, 272, 372 shown in FIG. 18 being an excerpt of print data in the form of a PDF print job such as might be used in one or more embodiments for printing of the document shown in FIG. 5.

FIGS. 19A through 19C show an example of print data that might be subjected to semantic analysis by semantic analyzer 120, 220, 320, the unanalyzed print data 172, 272, 372 shown in FIG. 16 being an excerpt of print data in the form of a KPDL or PostScript print job such as might be used in one or more embodiments for printing of the document shown in FIG. 5.

DETAILED DESCRIPTION

Methods, systems, and devices for semantic analysis of print data in accordance with embodiments of the present invention are described in detail below with reference to the drawings. Although the function(s) described with reference to the functional block diagrams included among the attached drawings are shown for convenience as separate functional blocks, the function of any one or more blocks may be incorporated in or integrated with the function of any one or more other blocks.

Figure 1:
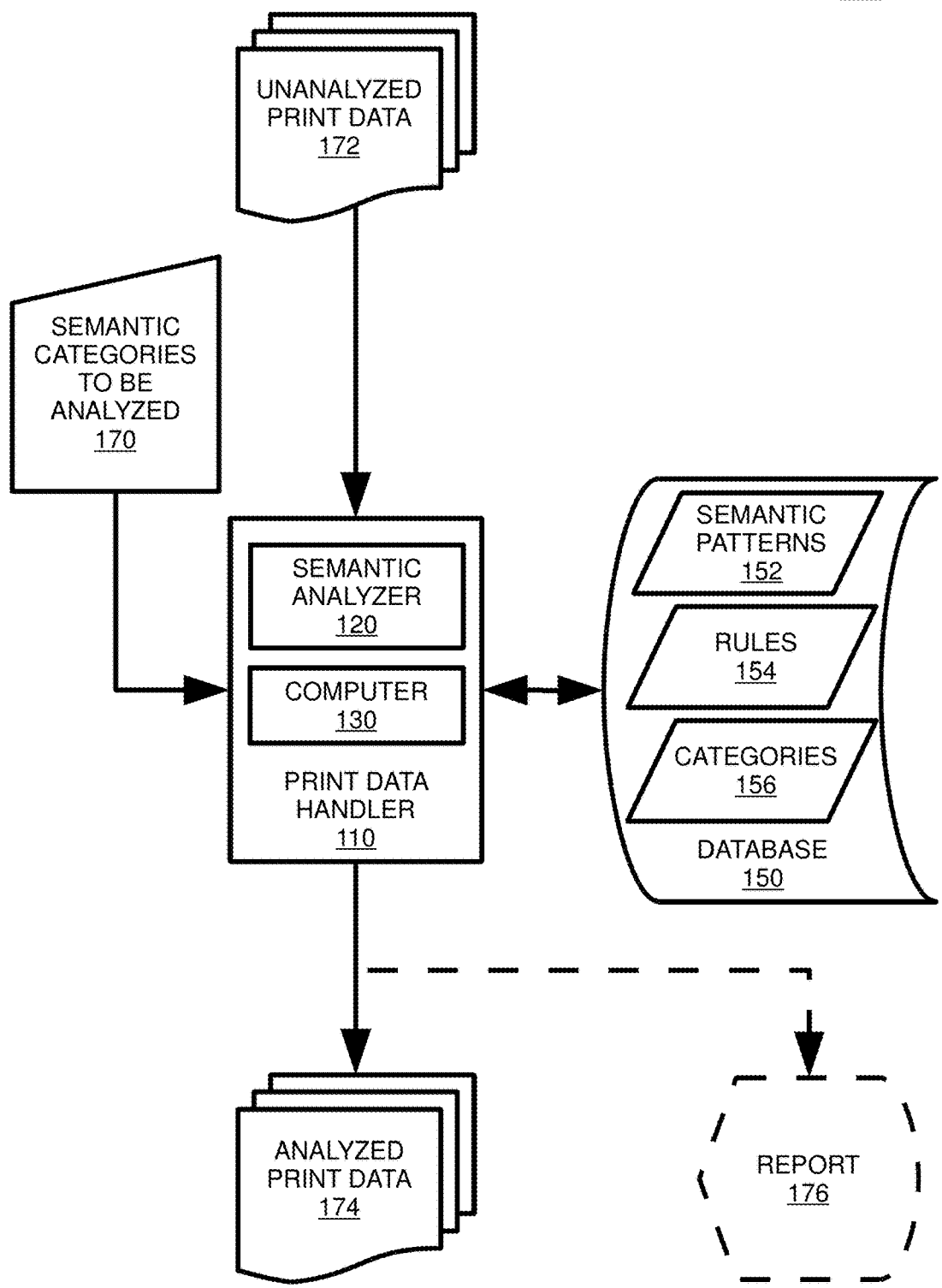
FIG. 1 is a functional block diagram of a print data semantic analysis system 100 in which semantic analyzer 120 at print data handler 110 may use semantic patterns 152 and rules 154 stored in database 150 to analyze print data 172 with respect to semantic category or categories to be analyzed 170 among semantic category or categories 156 at database 150 in accordance with an embodiment of the present invention.

FIG. 1 is a functional block diagram of a print data semantic analysis system 100 in which semantic analyzer 120 at print data handler 110 may use semantic patterns 152 and rules 154 stored in database 150 to analyze print data 172 with respect to semantic category or categories to be analyzed 170 among semantic category or categories 156 at database 150 in accordance with an embodiment of the present invention.

Print data semantic analysis system 100 shown in FIG. 1 comprises print data handler 110 and database 150.

Print data handler 110 may include semantic analyzer 120 and computer 130.

Figure 2:
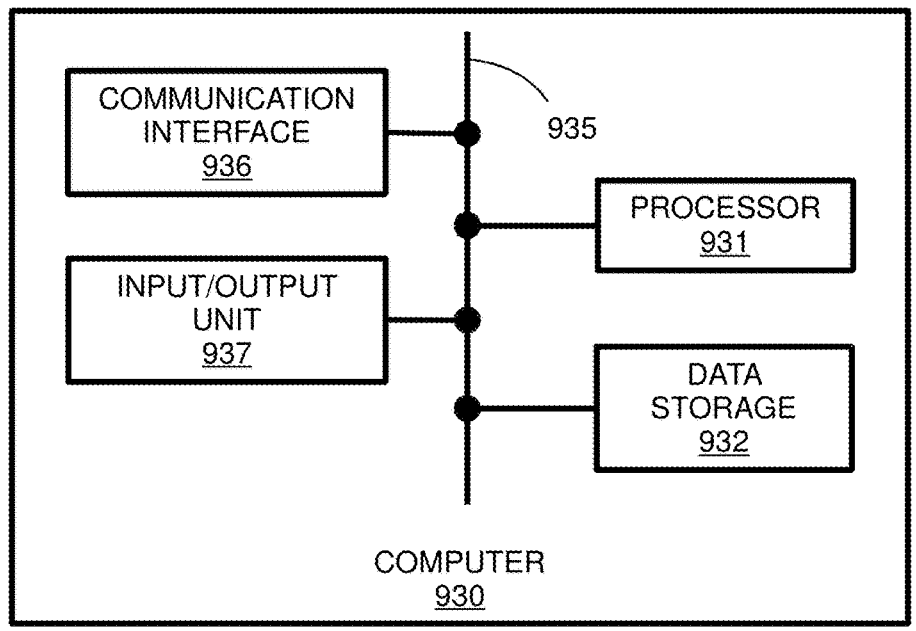
FIG. 2 is a functional block diagram of a computer 930 such as may be employed as computer 130 of print data handler 110 in print data semantic analysis system 100 shown in FIG. 1.

FIG. 2 is a functional block diagram of a computer 930. Computer 930 may include processor 931, data storage 932, communication interface 936, and input/output unit 937, all of which may be mutually coupled by way of bus 935 or similar mechanism.

Processor 931 may include one or more central processing units (CPUs), such as one or more general purpose processors and/or one or more dedicated processors (e.g., application specific integrated circuits also known as ASICs or digital signal processors also known as DSPs, etc.).

Data storage 932 may include volatile and/or non-volatile data storage and can be integrated in whole or in part with processor 931. Data storage 932 may store program instructions, executable by processor 931, and data that are manipulated by these instructions to carry out the various methods, processes, or function(s) described herein. Each of the various methods, processes, and function(s) described herein can be defined by hardware, firmware, and/or software, or any combination of hardware, firmware, and/or software. Data storage 932 may include a tangible non-transitory computer-readable medium having stored thereon program instructions that upon execution by processor 931 cause computer 930 to carry out any of the methods, processes, or function(s) described herein. In some embodiments, data storage 932 may be capable of storing other data in addition to such program instructions.

Communication interface 936 may be any hardware, firmware, and/or software component, or any combination of hardware, firmware, and/or software components, capable of performing the communication interface function(s) described herein. Communication interface 936 may engage in wired and/or wireless communication with one or more other computers. Communication interface 936 could take the form of a modem, Ethernet, Wi-Fi, Universal Serial Bus (USB), Bluetooth interface, and/or any other suitable type or types of communication interface.

Input/output unit 937 may include a user interface that facilitates user interaction with computer 930 to configure and/or control operation of processor 931 and/or provide output based on operations performed by processor 931. Input/output unit 937 may comprise a keyboard, mouse, touchpad, touchscreen, microphone, and/or any other device capable of receiving input from a user. Input/output function 937 may comprise a display, printer, light emitting diode (LED), speaker, and/or any other device capable of providing output discernible to a user. Where computer 930 supports remote access from another device by way of communication interface 936, the functionality of input/output unit 937 might be carried out by components at the other device.

In some embodiments, input/output unit 937 and/or data storage 932 may include nonremovable volatile and/or nonvolatile storage. In some embodiments, input/output unit 937 and/or data storage 932 may include removable storage interface(s) permitting communicative connection to removable volatile and/or nonvolatile storage. Such nonremovable and/or removable volatile and/or nonvolatile storage may include random access memory (RAM), read only memory (ROM), flash memory, solid state drive, tape drive, flexible disk, floppy disk, hard disk, Secure Digital (SD) card, xD picture card, compact flash, USB flash, compact disk (CD), digital versatile disk (DVD), and/or other such magnetic and/or optical disk and/or memory and/or other such suitable storage device, or any combination hereof.

Bus 935 may take the form of an electrical system bus or other such local interface that allows for internal communication among processor 931, data storage 932, communication interface 936, and input/output unit 937.

So long as it is able to perform the various methods, processes, or function(s) described herein, computer 930 need not have all of the components shown at FIG. 2. For example, in some embodiments, input/output unit 937 may be omitted where there is no particular need to interact with a user and/or peripheral equipment. In some embodiments, computer 930 may have components in addition to and/or other than those shown at FIG. 2. Although shown for convenience within one block in FIG. 2, there is no objection to employment of a distributed system in which any of the various functional blocks making up computer 930 are at disparate locations, in which case bus 935 may be supplemented by or replaced with multiple communication interfaces 936 to facilitate communicative connection between or among the various disparate components.

A computer similar to computer 930 shown in FIG. 2 may be employed as computer 130 of print data handler 110 in the embodiment shown at FIG. 1, in which case computer 130 at print data handler 110 in the embodiment shown at FIG. 1 might have processor 131, data storage 132, communication interface 136, input/output unit 137, and bus 135.

Print data handler 110 and database 150 might, for example, be communicatively connected via bus 135, input/output unit 137, and/or communication interface 136. Communicative connection between print data handler 110 and database 150, which preferably is such as to permit bidirectional communication therebetween but which at least allows retrieval by semantic analyzer 120 of semantic pattern(s) 152, rule(s) 154, and/or semantic category or categories 156 as needed by semantic analyzer 120 to carry out semantic analysis, might be carried out in wired and/or wireless fashion.

Wired communication might, for example, take the form of a serial bus, parallel bus, USB connection, IEEE 1394 connection, and/or any other suitable wired communication. Wireless communication might, for example, take the form of a Bluetooth, IEEE 802.15.4 (ZigBee), ANT, Infrared Data Association (IrDA), near field communication (NFC), IEEE 802.11, Wi-Fi, and/or any other suitable wireless connection. Note that there is no objection to combination of wired and wireless communication for communicative connection between print data handler 110 and database 150. Note further that communicative connection between print data handler 110 and database 150 need not take place directly via a single communication line or network, it being possible for communicative connection between print data handler 110 and database 150 to be carried out by way of any number of communication lines and/or networks which may intervene therebetween.

Figure 3:
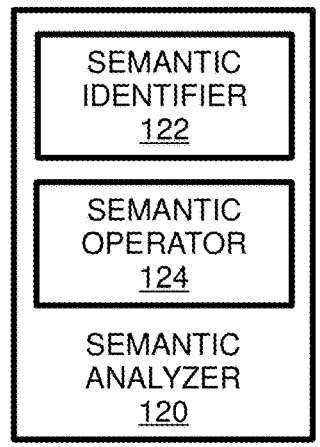
FIG. 3 is a functional block diagram of a semantic analyzer 120 in which semantic operator 124 carries out operations in correspondence to rules 154 when semantic identifier 122 recognizes semantic patterns 152 in print data 172 in accordance with an embodiment of the present invention.

Referring to FIG. 3, in some embodiments, semantic analyzer 120 may comprise semantic identifier 122 and semantic operator 124. During semantic analysis of print data 172 by semantic analyzer 120, semantic operator 124 may carry out operations in correspondence to rule(s) 154 when semantic identifier 122 recognizes semantic pattern(s) 152 in print data 172.

At print data semantic analysis system 100, semantic analyzer 120 at print data handler 110 may analyze semantic content in unanalyzed print data 172 when semantic identifier 122 recognizes semantic pattern(s) 152 therein and semantic operator 124 carries out operations according to rule(s) 154 that may differ depending on which among the semantic category or categories 156 at database 150 have been selected or otherwise designated as semantic category or categories to be analyzed 170, to produce analyzed print data 174 and/or report 176.

The term "database" as used herein need not necessarily connote a relational database or any other such particular organization of data, it being sufficient that the semantic pattern(s) 152, rule(s) 154, and/or semantic category or categories 156 described as being present at database(s) 150 are accessible by semantic analyzer(s) 120 when needed to carry out semantic analysis of print data 172. That is, whereas the drawings and specification refer to database(s) 150, except where otherwise clear from context this should not be taken to necessarily imply presence of dedicated, special-purpose, or separate database(s) 150, it being sufficient that the information described as being present in database(s) 150, i.e., semantic pattern(s) 152, rule(s) 154, and/or semantic category or categories 156, is available to semantic analyzer(s) 120.

While there is no particular objection to employment of a relational database or other such dedicated, special-purpose, or separate database, and in some embodiments it may be advantageous to, for example, employ a cloud-based relational database or the like that is separately managed by a database administrator, so that semantic analyzers 120 in print data handlers 110 at various devices throughout an organization can query such a database 150 for, or otherwise retrieve therefrom, semantic pattern(s) 152, rule(s) 154, and/or semantic category or categories 156 as needed to carry out semantic analysis of print data 172, while permitting such database 150 to be efficiently centrally managed and/or updated by the database administrator, it is also possible in other embodiments that the information shown and described as being present at database 150 be written directly into source code (whether hardware, firmware, and/or software, or any combination of hardware, firmware, and/or software), take the form of functions that are called by such source code and/or by semantic analyzer 120, be organized into lookup table(s) and/or other such table(s) accessible when needed by such source code and/or by semantic analyzer 120, or take any other form such as will permit the information described as being present in database(s) 150, i.e., semantic pattern(s) 152, rule(s) 154, and/or semantic category or categories 156, to be made available when needed by semantic analyzer 120 to carry out semantic analysis of print data 172.

Although database 150 is for convenience shown at FIG. 1 as a separate functional block to which print data handler 110 is communicatively connected, it should be noted that there is no particular restriction with respect to the location of database 150 relative to print data handler 110 or to the manner in which such communicative connection therebetween is implemented, it being possible in various embodiments for such database 150 to be present at and/or accessible via any combination of the components of computer 930 shown in FIG. 2. That is, in various embodiments, database 150 may be present in volatile and/or nonvolatile memory at processor 131, may be stored at data storage 132, may be retrievable via input/output unit 137, and/or may be accessible via communication interface 136.

As used herein, "print data" may be any data that is in or may be converted into a format capable of being printed by a printer. In some embodiments, print data may be the content of print job(s), data based on which print job(s) may be created, and/or data that may result from RIPping or similar processing of print job(s). Such print job(s) may be created by printer driver(s) and may contain instruction(s) in any suitable page description language(s) (PDL(s)) or other suitable format(s); for example, print data might in some embodiments take the form of @PJL data, Open XML Paper Specification or other such XPS print data and/or ticket(s), Portable Document Format (PDF), Kyocera Page Description Language (KPDL) or other such specialized page description language or PostScript text data, PCL 5 or PCL XL or other such printer control language (PCL) instruction(s), user-defined function(s), and/or any other suitable format(s). In some embodiments, print data is a bitmap, pixmap, and/or other such raster image which may have been created by raster image processor(s) (RIP(s)), e.g., as a result of interpretation of PDL instruction(s) within print job(s) by PDL interpreter(s), and which may contain binary data that may be suitable for direct input to printhead driver(s).

Note that as semantic analysis in accordance with the present invention may in some embodiments be carried out serially or in stages such that analyzed print data 174 resulting from analysis performed at one stage may serve as unanalyzed print data 172 for analysis to be performed at a subsequent stage, except where otherwise clear from context, the terms "unanalyzed" and "analyzed" should therefore not be understood as necessarily indicating that print data is "unanalyzed" or "analyzed" in any absolute sense, but rather that where semantic analysis is carried out in multiple stages such print data is "unanalyzed print data" in the sense of being input for the current stage of semantic analysis, or is "analyzed print data" in the sense of being output from the current stage of semantic analysis.

Semantic pattern(s) 152, which may be associated with rule(s) 154 at database 150, may be pattern(s) corresponding to content to be recognized by semantic identifier 122 of semantic analyzer 120 during semantic analysis of unanalyzed print data 172.

Rule(s) 154, which may be associated with semantic pattern(s) 152 at database 150, may describe action(s) to be performed by semantic operator 124 of semantic analyzer 120 when semantic pattern(s) 152, e.g., semantic pattern(s) 152 belonging to semantic category or categories to be analyzed 170, are recognized by semantic identifier 122 of semantic analyzer 120 during semantic analysis of unanalyzed print data 172.

Action(s) which might be described by rule(s) 154 and which might be performed by semantic operator 124 of semantic analyzer 120 at print data handler 110 when respective semantic pattern(s) 152 are recognized by semantic identifier 122 of semantic analyzer 120 during semantic analysis of unanalyzed print data 172 might in some embodiments be as simple as mere counting of the number of instance(s) of occurrence of respective semantic pattern(s) 152 therewithin, and/or the number of instance(s) of occurrence, within unanalyzed print data 172, of semantic pattern(s) 152 belonging to any and/or all of the various semantic category or categories 156 at database 150, and/or might in some embodiments involve modification of unanalyzed print data 172 to produce analyzed print data 174 in which occurrence(s) of respective semantic pattern(s) 152 within analyzed print data 174 are highlighted, e.g., with different color, hatching, and/or other such patterning in correspondence to the category or categories to which those semantic pattern(s) 152 belong, and/or are obscured, e.g., by replacement with a solid black field in the shape of a rectangle or any other suitable shape, and/or by blurring, replacing, omitting, or otherwise obscuring to prevent identification, recognition, and/or understanding thereof by a person who views the analyzed print data 174.

Note that analyzed print data 174 may not necessarily be different from unanalyzed print data 172, and/or need not necessarily be different from the print data that would have been produced by print data handler 110 not equipped with a semantic analyzer 120. That is, in an embodiment in which a report 176 is produced as a result of semantic analysis by semantic analyzer 120, this report 176 may suffice as the only tangible output attributable to semantic analyzer 120, in which case it is possible that unanalyzed print data 172 might pass unaltered through print data handler 110, or where print data handler 110 is a printer driver or a raster image processor (RIP), for example, unanalyzed print data 172 might be converted to page description language (PDL) or to a raster image as might normally be the case were no semantic analyzer 120 present. The term "analyzed" where it appears at "analyzed print data 174" should therefore not be taken to necessarily indicate that the print data has been altered relative to unanalyzed print data 172 and/or relative to the print data which would have been output from print data handler 110 were semantic analyzer 120 not present, but should rather be understood in some circumstances to mean only that unanalyzed print data 172 has been subjected to semantic analysis by semantic analyzer 120, at which time at least one action in accordance with at least one rule 154 at database 150 was carried out, such action, in a situation where a report 176 is produced as a result of semantic analysis by semantic analyzer 120, not necessarily causing alteration of print data relative to unanalyzed print data 172 and/or relative to the print data which would have been output from print data handler 110 were semantic analyzer 120 not present.

In some embodiments, database 150 may include semantic pattern(s) 152 and rule(s) 154. In some embodiments, database 150 may further include semantic category or categories 156.

At database 150, semantic pattern(s) 152, rule(s) 154, and/or semantic category or categories 156 may be stored in mutually associated fashion. At database 150, semantic pattern(s) 152 and/or rule(s) 154 may be associated with one or more semantic categories.

Semantic category or categories to be analyzed 170 may be all or any portion of the category or categories 156 that may be associated with semantic pattern(s) 152 and/or rule(s) 154 at database 150. Semantic category or categories to be analyzed 170, which may be entered by a user, e.g., by selection from a menu displayed by a printer driver, or which may be entered automatically based on default or standard value(s), may cause semantic analyzer 120 of print data handler 110 to employ, of the semantic pattern(s) 152 and/or rule(s) 154 at database 150, only those semantic pattern(s) 152 and/or rule(s) 154 that are associated with the entered semantic category or categories to be analyzed 170 during semantic analysis of unanalyzed print data 172 by semantic analyzer 120.

In an embodiment in which all categories 156 at database 150 are always to be employed for semantic analysis; or expressing this differently, where there is only a single category 156 at database 150 and all semantic pattern(s) 152 and rule(s) 154 belong to this single category 156, there may be no need for entry, either manually by a user or automatically based on default or standard value(s), of semantic category or categories to be analyzed 170, since in such an embodiment it may already be known that all semantic pattern(s) 152 and rule(s) 154 are to be employed for semantic analysis of unanalyzed print data 172. That is, in some embodiments, categories 156, 256, 356 respectively shown in FIGS. 1, 9, and 11 need not be present.

Print data handler 110 might, for example, take the form of a smartphone or other such mobile telephone, computer client or client terminal, computer server or server terminal, personal digital assistant (PDA), notebook computer, laptop computer, tablet computer, wearable computer, desktop computer or other such personal computer that may be equipped with a printer driver or other such print job creation functionality, a printer or similar device that may be equipped with a raster image processor (RIP) or other such imaging unit or image rendering functionality, or any other suitable computer-equipped device capable of carrying out semantic analysis of unanalyzed print data 172.

As used herein, a "printer" may be any device capable of producing, or preparing for producing, e.g., through creation of a raster image, printed output. A printer in accordance with some embodiments of the present invention might, for example, take the form of a black-and-white (or monochrome) printer or color printer, or might take the form of a multifunction peripheral (MFP) in which printer functionality is combined with functionality or functionalities of one or more other devices that might include image scanner, facsimile machine, copy machine, and/or document storage device.

It should be noted, however, that as used herein the term "printer" need not imply ability to produce printed output, it being sufficient in some embodiments that what is referred to herein as a "printer" have a raster image processor (RIP) or other such imaging unit or image rendering functionality. A printer in accordance with some embodiments of the present invention might, for example, take the form of a print server or raster image processor (RIP) server capable of producing data in bitmap format, pixmap format, and/or other such raster image format suitable for output to printhead driver(s). In some embodiments, what is referred to herein as a "printer" may take the form of a desktop application, mobile application, web browser, terminal communication program, communication applet or utility, and/or any other suitable hardware, firmware, and/or software, or any combination of hardware, firmware, and/or software capable of producing data in bitmap format, pixmap format, and/or other such raster image format suitable for output to printhead driver(s).

Where print data handler 110 is a printer, the printer may include a printhead or similar device (referred to collectively herein as "printhead") for applying ink or other such marking material (referred to collectively herein as "ink") to paper or other such print media (referred to collectively herein as "print media"). Depending on the technology employed, such a printer might, for example, employ a laser, inkjet, and/or dot-matrix printhead to carry out printing.

In some embodiments, such a printer may include job layer functionality for control and/or routing of print jobs to be printed at the printer. In some embodiments, the printer may include page description language (PDL) interpreter(s) or other such functionality for interpreting and carrying out print instruction(s). In some embodiments, the printer may include raster image processor(s) (RIP(s)) or other such functionality for converting print data to bitmap, pixmap, and/or other such raster image format(s) suitable for direct input to printhead driver(s). In some embodiments, print data may be made available to imaging unit(s) of the printer in bitmap and/or pixmap form by graphical device interface(s) (GDI(s)) and/or by separate RIP(s), for example.

In an embodiment in which the print data handler 110 is a printer, an imaging unit at such printer may be configured to carry out printing of print data in the form of print jobs received via communication interface 136 of computer 130. In some embodiments, print data might be received at the printer via communication interface 136 and/or data storage 132 of computer 130 or via a USB thumb drive or other such removable storage device which might, for example, be inserted into a removable storage interface at data storage 132 or input/output unit 137 of computer 130.

In some embodiments, semantic pattern(s) 152, rule(s) 154, and/or semantic category or categories 156 at database 150 may have a data structure such that, when the data structure is accessed by semantic analyzer 120, the data structure will permit semantic identifier 122 of semantic analyzer 120 to recognize semantic pattern(s) 152 in unanalyzed print data 172 and will permit semantic operator 124 of semantic analyzer 120 to carry out operations according to rule(s) 154 in correspondence to such recognized semantic pattern(s) 152. That is, association of rule(s) 154 with semantic pattern(s) 152 within such data structure may in some embodiments make it possible for semantic analyzer 120 to perform action(s) defined by rule(s) 154 in correspondence to semantic pattern(s) 152.

In some embodiments, semantic pattern(s) 152, rule(s) 154, and/or semantic category or categories 156 at database 150 may have a data structure such that, when the data structure is accessed by semantic analyzer 120, the data structure will permit semantic analyzer 120 to carry out operations on semantic pattern(s) 152 in unanalyzed print data 172 in correspondence to the category or categories to which those semantic pattern(s) 152 belong. For example, in some embodiments it may be that operations are carried out only on semantic pattern(s) 152 that are associated with entered or otherwise designated semantic category or categories to be analyzed 170. That is, association of semantic pattern(s) 152 and semantic category or categories 156 within such data structure may in some embodiments make it possible for semantic analyzer 120 to perform action(s) defined by rule(s) 154 in correspondence to semantic category or categories 156.

In a preferred embodiment, semantic pattern(s) 152, rule(s) 154, and/or semantic category or categories 156 at database 150 may be encrypted, encoded, and/or otherwise made unintelligible when accessed by a human being not in possession of a decryption key and/or other tool for decryption, decoding, and/or otherwise rendering these intelligible. In such an embodiment, this may prevent unauthorized users from gaining access to semantic pattern(s) 152, rule(s) 154, semantic category or categories 156, and/or print data, and may make it possible to prevent such unauthorized users from thwarting the censoring or other such semantic analysis of that print data.

Database 150, or any portion thereof, may be physically present at data storage 132 and/or any other suitable location(s) at print data handler 110. Database 150, or any portion thereof, need not necessarily be physically present at print data handler 110, it being sufficient that database 150, or portion(s) thereof, are accessible at least when needed by semantic analyzer 120. In some embodiments, print data handler 110 and/or semantic analyzer 120 may, for example, access database 150 or any portion thereof by way of input/output unit 137 and/or communication interface 136 of computer 130.

The term "database" is used for convenience herein to refer to information which may include one or more of semantic pattern(s) 152, rule(s) 154, and/or semantic category or categories 156 regardless of the form(s) and/or location(s) in which that information exists. There is therefore no particular objection in various embodiments to employment of database(s) 150 that may take the form of source code, function(s), lookup or other such table(s), and/or any other format(s) such as will permit access by semantic analyzer(s) 120 when needed to carry out semantic analysis of print data 172.

In some embodiments, print data handler 110, and/or semantic analyzer 120 which may be contained therein, may be capable of accepting unanalyzed print data 172 as input thereto and may be capable of producing analyzed print data 174 as output therefrom. Under some circumstances, the analyzed print data 174 produced as a result of semantic analysis by semantic analyzer 120 of unanalyzed print data 172 need not necessarily cause alteration of print data relative to unanalyzed print data 172 and/or relative to the print data which would have been output from print data handler 110 were semantic analyzer 120 not present. In some embodiments, in addition to whatever semantic analysis may be performed by semantic analyzer 120 at print data handler 110, print data handler 110 may also have functionality for causing format of unanalyzed print data 172 to be converted so that analyzed print data 174 is in a format which is different from that of unanalyzed print data 172.

For example, in any of various preferred embodiments where print data handler 110 may be a printer driver or a raster image processor, for example, unanalyzed print data 172 might be converted to page description language (PDL) format or to raster image format as part of the normal processing, i.e., processing of the sort that might be carried out even where no semantic analyzer 120 is present at print data handler 110, occurring as print data is prepared for printing.

In some embodiments, semantic analyzer 120 may have functionality for using semantic pattern(s) 152 and/or rule(s) 154 stored at database 150 to perform semantic analysis of unanalyzed print data 172. In some embodiments, semantic analyzer 120 may have functionality for carrying out such semantic analysis with respect to semantic category or categories to be analyzed 170 among semantic category or categories 156 at database 150. In some embodiments, semantic analyzer 120 may have functionality for producing a report 176 describing results of semantic analysis performed on unanalyzed print data 172.

In some embodiments, semantic analyzer 120 may have functionality for causing a user interface at input/output unit 137 of computer 130 to prompt and/or accept input from a user, and may have functionality for carrying out semantic analysis based on input received from the user. For example, semantic analyzer 120 may carry out semantic analysis with respect to semantic category or categories to be analyzed 170 input by a user via input/output unit 137 of computer 130.

Figure 4:
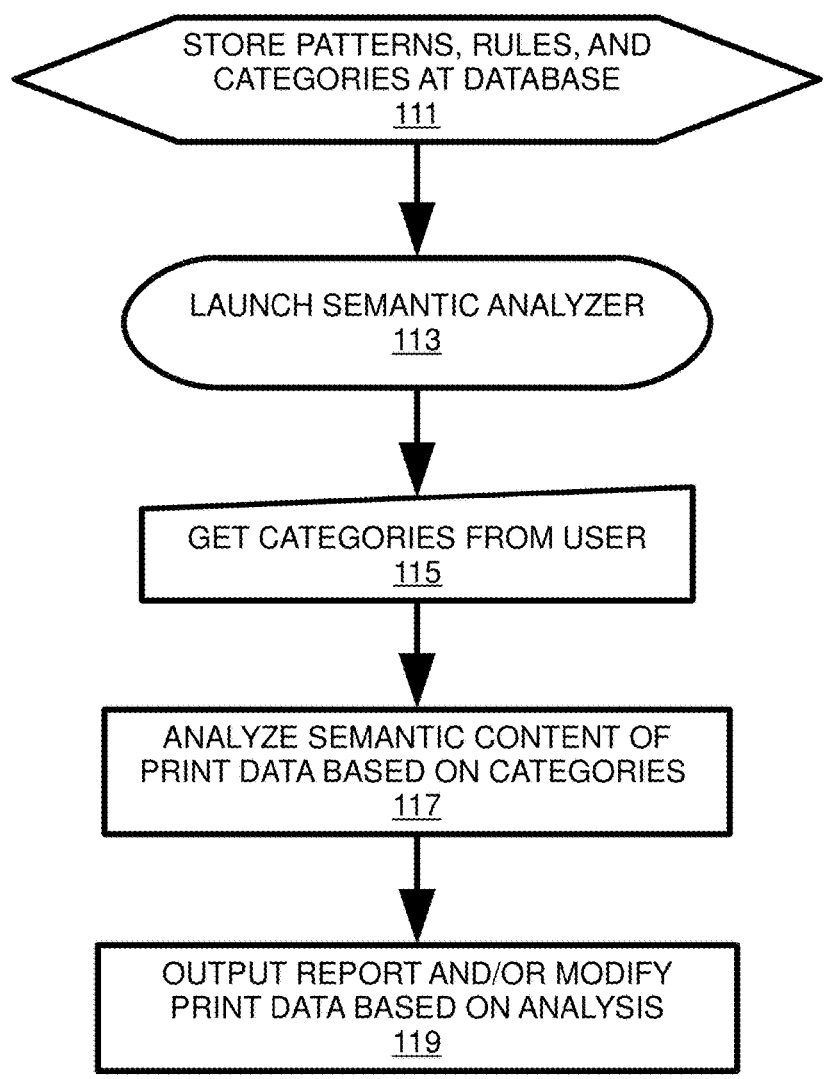
FIG. 4 is a flowchart showing flow of processing that might take place at print data handler 110 in print data semantic analysis system 100 shown in FIG. 1.

Referring to FIG. 4, flow of processing such as might take place at print data handler 110 in print data semantic analysis system 100 shown in FIG. 1 will now be described.

At print data semantic analysis system 100 in accordance with the embodiment shown at FIG. 1, semantic analyzer 120 at print data handler 110 may use semantic patterns 152 and rules 154 stored in database 150 to analyze print data 172 with respect to semantic category or categories to be analyzed 170 among semantic category or categories 156 at database 150.

At step 111 in the flowchart shown in FIG. 4, semantic pattern(s) 152, rule(s) 154, and/or semantic category or categories 156 may be stored in mutually associated fashion at database 150. In one embodiment, semantic pattern(s) 152, rule(s) 154, and/or semantic category or categories 156 are preferably previously stored at database 150 via a settings web page, utility, application, or the like that in some embodiments might require entry of a password by an administrator of print data semantic analysis system 100.

Semantic patterns 152 may be words, phrases, sentences, URLs, images, filenames, any of various attributes from the Properties of a print job or other such print data file which is being subjected to semantic analysis by semantic analyzer 120, and/or any other computer-recognizable pattern having semantic content. By "semantic content" it is meant only that some meaning or significance may be conveyed thereby, without regard to whether such content is in the form of text, image, or binary or other such data form. The term "semantic pattern" may be used herein to indicate anything in print data that may be recognized for analysis by semantic analyzer 120. Note that what is referred to herein as a semantic pattern need not be immediately recognizable as such to the human eye; for example, textual matter in images; visual matter arising as an artifact of text; misspelled words; variations on phrases; patterns in which order of letters, words, or other such symbols is reversed; diagonal patterns; and so forth are all possible examples of semantic patterns 152 that might be employed in embodiments of the present invention.

Rules 154 may be operations to be carried out for counting, highlighting with any of various colors and/or hatch or other such patterns, blurring, replacing, striking, crossing out, blackening or otherwise obscuring and/or censoring, or otherwise filtering, semantic patterns 152.

By causing semantic patterns 152 to be grouped into or associated with various semantic categories 156, this may conveniently allow semantic analysis at semantic analyzer 120 to be performed with respect to a set of semantic patterns 152 associated with or belonging to one or more of those semantic categories 156. Note that such grouping into or association with semantic category or categories 156 need not necessarily imply that semantic patterns 152 of a particular semantic category 156 are located or organized in physical proximity within database 150, it being possible for such grouping or association to be implemented by means of flag(s), variable(s), or other suitable attribute(s), or by means of any other suitable programming or similar technique.

For example, in one exemplary embodiment, there might be three semantic categories 156 at database 150, these being, for example, "Confidential", "Rated", and "Illegal". In such an embodiment, each of the semantic patterns 152 stored at database 150 might be associated with one or more of these three categories.

In such an embodiment, the "Confidential" category might apply to semantic patterns 152 that a company or similar organization considers to be proprietary or secret or otherwise unsuitable for disclosure or divulgence. Examples might include words, phrases, images and/or or other such semantic patterns 152 associated with new products still under development, and/or might include words, phrases, images and/or or other such semantic patterns 152 associated with personal data, financial data, or other proprietary information not deemed suitable for disclosure outside of the organization in question.

Furthermore, in such an embodiment, the "Rated" category might apply to words, phrases, sentences, images, URLs, filenames, and/or other such semantic patterns 152 associated with vulgar, racy, or scandalous subject matter.

Moreover, in such an embodiment, the "Illegal" category might apply to semantic patterns 152 that can cause irreparable harm to companies, institutions, and/or individuals by hurting feelings, discriminating, offending, or dividing people, examples of which might be semantic patterns 152 that are considered racist, offensive of any of various religions, or disrespectful of women or other such groups of people.

At step 113 in the flowchart shown in FIG. 4, a user at print data handler 110 might operate a touchscreen, mouse, keyboard, and/or other such input device of a user interface at input/output unit 137 of computer 130 to launch semantic analyzer 120 at print data handler 110.

In some embodiments, print data handler 110 may be hardware, firmware, and/or software, or any combination of hardware, firmware, and/or software, having functionality for parsing, filtering, or otherwise processing print data so as to cause unanalyzed print data 172 to be converted such that analyzed print data 174 is in a format which is different from that of unanalyzed print data 172. For example, in some embodiments print data handler 110 might preferably be a printer driver or raster image processor, for example, that, in addition to or in conjunction with whatever processing is carried out by semantic analyzer 120, causes unanalyzed print data 172 to be converted to page description language (PDL) format or raster image format. That is, semantic analyzer 120 might in some embodiments be conveniently implemented in conjunction with the conversion of print data to PDL and/or raster image that might typically place as part of normal processing, i.e., processing of the sort that might be carried out even where no semantic analyzer 120 is present at print data handler 110, as print data is prepared for printing.

The functionality of semantic analyzer 120 may be incorporated into a desktop application, mobile application, printer driver or similar functionality for creation and/or modification of a print job, web browser, terminal communication program, communication applet or utility, raster image processor (RIP) or other such imaging or rendering functionality or otherwise suitable functionality at a printer or similar device, and/or any other suitable hardware, firmware, and/or software, or any combination of hardware, firmware, and/or software, capable of accepting unanalyzed print data 172 as input thereto, capable of producing analyzed print data 174 as output therefrom, and capable of retrieving data from database 150.

At step 115 in the flowchart shown in FIG. 4, semantic analyzer 120 might, by way of a display or other such output device of a user interface at input/output unit 137 of computer 130, prompt the user to enter semantic category or categories to be analyzed 170. In response to being prompted in this fashion, the user at print data handler 110 might operate a touchscreen, mouse, keyboard, and/or other such input device of a user interface at input/output unit 137 of computer 130 to select or otherwise designate semantic category or categories to be analyzed 170 from among the semantic category or categories 156 at database 150.

In some embodiments, where there is no need for user input of semantic category or categories to be analyzed 170 at step 115 in the flowchart shown in FIG. 4, step 115 may be omitted. For example, in some embodiments, standard or default values might be automatically employed as semantic category or categories to be analyzed 170. Or in an embodiment that does not employ semantic categories 156, or in an embodiment in which there is only a single category 156 at database 150 and all semantic pattern(s) 152 and rule(s) 154 belong to this single category 156, or in an embodiment in which all categories 156 at database 150 are always to be employed for semantic analysis, there may be no need for entry, either manually by a user or automatically based on default or standard value(s), of semantic category or categories to be analyzed 170, since in such an embodiment it may already be known that all semantic pattern(s) 152 and rule(s) 154, or any standard or default subset thereof, are to be employed for semantic analysis of unanalyzed print data 172. Such automatic operation of semantic analyzer 120 may be particularly desirable in embodiments in which semantic analyzer 120 is employed for its ability to censor all or any portion of the print data that is handled by an organization, in which case storage and/or configuration of semantic pattern(s) 152, rule(s) 154, and/or semantic category or categories 156 at database 150 may preferably require entry of a password, for example, so that such storage and/or configuration might be carried out only by an administrator, for example.

Conversely, in some embodiments it may be possible at step 115 in the flowchart shown in FIG. 4 for a user to alternatively or additionally freely enter or otherwise configure semantic pattern(s) 152, rule(s) 154, and/or semantic category or categories 156 at database 150. That is, in such an embodiment, the storage of semantic pattern(s) 152, rule(s) 154, and/or semantic category or categories 156 at database 150 which was described above with reference to step 111 might take place, e.g., interactively via a user interface at input/output unit 137 of computer 130, at step 115. Or in another embodiment, storage of semantic pattern(s) 152, rule(s) 154, and/or semantic category or categories 156 at database 150 might take place as described with reference to step 111 but be capable of modification, e.g., interactively via a user interface at input/output unit 137 of computer 130, at step 115.

In embodiments in which the user is able at step 115 to configure or modify configuration of semantic pattern(s) 152, rule(s) 154, and/or semantic category or categories 156 at database 150, semantic analyzer 120 might cause semantic pattern(s) 152, rule(s) 154, and/or semantic category or categories 156 currently stored at database 150 (if any) to be displayed at a display or other such output device of a user interface at input/output unit 137 of computer 130, and might prompt the user to enter or select semantic pattern(s) 152, rule(s) 154, and/or semantic category or categories 156 for storage at database 150 before, in an embodiment in which categories are employed for semantic analysis and it is necessary or desirable (e.g., because there is more than one category, all categories are not automatically employed for semantic analysis, and standard or default values for semantic category or categories to be analyzed 170 are not automatically entered), prompting the user to enter or otherwise designate semantic category or categories to be analyzed 170 from among the semantic category or categories 156 at database 150.

In the embodiment described above in which there are three semantic categories 156 at database 150, these being "Confidential", "Rated", and "Illegal", a radio-button-type user interface at input/output unit 137 of computer 130 might, for example, allow the user to select any one of these three categories, or a checkbox-type user interface at input/output unit 137 of computer 130 might, for example, allow the user to select any combination of these three categories.

At step 117 in the flowchart shown in FIG. 4, semantic analyzer 120 may analyze semantic content in unanalyzed print data 172 by causing semantic identifier 122 to recognize semantic pattern(s) 152 therein and by causing semantic operator 124 to carry out operations according to rule(s) 154 associated with recognized semantic pattern(s) 152, thus allowing operation(s) defined by rule(s) 154 to be carried out in correspondence to semantic pattern(s) 152. In an embodiment in which categories are employed, semantic identifier 122 of semantic analyzer 120 might only recognize semantic pattern(s) 152 that are associated with semantic category or categories to be analyzed 170 as entered or otherwise designated at step 115, and/or might ignore (i.e., not cause semantic identifier 122 to recognize, and/or not cause semantic operator 124 to perform operation(s) defined by rule(s) 154 associated with) semantic pattern(s) 152 that do not belong to, i.e., are not associated with, such semantic category or categories to be analyzed 170.

At step 119 in the flowchart shown in FIG. 4, the analyzed print data 174 and/or report 176 that is produced when semantic operator 124 of semantic analyzer 120 carries out operation(s) defined by rule(s) 154 at step 117 may be output by way of a printer, display, or other such output device of a user interface at input/output unit 137 of computer 130 and/or at a remote location via communication interface 136, and/or may be output in the form of a file which might be sent to a remote location via communication interface 136 and/or stored at data storage 132 and/or stored via a USB thumb drive or other such removable storage device which might, for example, be inserted into a removable storage interface at data storage 132 or input/output unit 137 of computer 130.

In a preferred embodiment, in addition to and/or in conjunction with the semantic analysis that is carried out at step 117 in the flowchart shown in FIG. 4, there may be parsing, filtering, and/or other such processing of print data that causes unanalyzed print data 172 to be converted such that analyzed print data 174 is in a format different from that of unanalyzed print data 172. Where print data handler 110 is a printer driver, for example, in addition to and/or in conjunction with the semantic analysis carried out at step 117, unanalyzed print data 172 might be converted to page description language (PDL) format. Or where print data handler 110 is a raster image processor (RIP), for example, in addition to or in conjunction with the semantic analysis carried out at step 117, unanalyzed print data 172 might be converted to raster image format. Examples in which print data handler 110 is a printer driver or a raster image processor (RIP) are respectively described below with reference to FIGS. 9 and 10 (printer driver) and with reference to FIGS. 11 and 12 (RIP).

Concrete examples of the sort of processing that might be carried out at step 117 and/or output at step 119 are described with reference to FIGS. 5 through 8. At FIGS. 5 through 7, note that print data content is for convenience shown as it would appear when printed; that is, while printed output is for convenience shown at FIGS. 5 through 7, the print data output at step 119 might, depending on the details of the embodiment in question, actually be in PDL format, raster image format, or the like.

FIG. 5 shows an example of unanalyzed print data 172 which might be subjected to analysis by semantic analyzer 120 at print data handler 110 in print data semantic analysis system 100 shown in FIG. 1. The text and image content in the document shown at FIG. 5 is an example of a corporate project which, in the fictitious example shown, is code-named "Interlock" and involves proprietary technology still under development and thus not deemed suitable for divulgence outside the company.

FIG. 6 is an example of analyzed print data 174 that might result when the unanalyzed print data 172 of FIG. 5 is subjected to censoring, this being one application of the semantic analysis which may be carried out by semantic analyzer 120 and which was described above with reference to step 117 in the flowchart shown in FIG. 4.

In the context of an embodiment in which there are the three exemplary semantic categories 156 at database 150 which were mentioned above ("Confidential", "Rated", and "Illegal"), a user at step 113 in the flowchart shown in FIG. 4 might have selected "Confidential" from a radio-button-type user interface to cause semantic analyzer 120 to produce the analyzed print data 174 shown in FIG. 6. To produce the analyzed print data 174 shown in FIG. 6 at step 119 in the flowchart shown in FIG. 4, semantic analyzer 120 might at step 117 have carried out semantic analysis in which, as unanalyzed print data 172 is being processed by a printer driver or a RIP, for example, semantic analyzer 120 causes occurrences of semantic patterns 152 in unanalyzed print data 172 that are associated with the selected category ("Confidential") to be recognized by semantic identifier 122, and at each semantic pattern 152 so recognized, causes rule(s) 154 associated with the recognized semantic pattern 152 to be carried out by semantic operator 124.

For example, to produce the text portions of the analyzed print data 174 shown in FIG. 6, semantic identifier 122 of semantic analyzer 120 might recognize instances of text previously stored at database 150 as semantic patterns 152 associated with the category "Confidential", and semantic operator 124 might at each such instance, in accordance with rule(s) 154 associated therewith at database 150, cause the print data at the location corresponding to that text to be replaced with print data for causing printing of a solid black field that will completely obscure that text in the analyzed print data 174.

The image of the interlocking components at the right side in the unanalyzed print data 172 shown in FIG. 5 might be recognized by semantic identifier 122 of semantic analyzer 120 through similar textual analysis on the basis of the image's filename (e.g., if the filename contained the word "interlock"), or semantic identifier 122 of semantic analyzer 120 might in some embodiments be capable of recognizing the image of the interlocking components through image recognition processing or other such image analysis based on comparison of the image data in the unanalyzed print data 172 and image data previously stored at database 150 as a semantic pattern 152 associated with the category "Confidential". Processing of images by semantic identifier 122 of semantic analyzer 120 may also include optical character recognition, the text obtained as a result of such optical character recognition being in some embodiments thereafter subjected to textual analysis as described above with reference to locations of text in the example shown in FIG. 6.

Where semantic identifier 122 of semantic analyzer 120 finds an image in unanalyzed print data 172 that matches (or is a near-match for) a semantic pattern 152 at database 150 associated with a semantic category to be analyzed 170 (e.g., the category "Confidential" in the example given above), at each such instance semantic operator 124 of semantic analyzer 120 might cause the print data at the location corresponding to the image in the analyzed print data 174 to be replaced with a blurred, pixelated, or otherwise obscured version of that image print data, as has been done in the example of the image of the interlocking components at the right side of FIG. 6.

In some embodiments, recognition of text and/or images by semantic identifier 122 of semantic analyzer 120 might employ fuzzy logic or other such algorithms for recognizing not only perfect matches between patterns in unanalyzed print data 172 and semantic patterns 152 stored at database 150, but also near-matches and variations, so as to permit semantic identifier 122 of semantic analyzer 120 to recognize semantic patterns 152 even when text is misspelled, spelled backwards, arranged vertically rather than horizontally, arranged diagonally within multiple lines of contiguous text, or is otherwise spatially altered relative to what is expected based on the semantic patterns 152 stored in database 150. Similar algorithms may in some embodiments be employed for recognition of images notwithstanding the possibility of variation which may exist with respect to size, magnification, color, lighting, background, and so forth in the images as contained in unanalyzed print data 172 versus images as stored as semantic patterns 152 in database 150. In particular, semantic identifier 122 of semantic analyzer 120 may in some embodiments automatically or at the direction of the user employ regular expressions, wildcards, and/or such search-expanding variables or functions, or other suitable technique to cause semantic identifier 122 of semantic analyzer 120 to recognize not only perfect matches but also near-matches.

FIG. 7 is another example of analyzed print data 174 that might result when the unanalyzed print data 172 of FIG. 5 is subjected to analysis by semantic analyzer 120 at print data handler 110 in print data semantic analysis system 100 shown in FIG. 1.

The locations that were censored by obscuration with solid black rectangular fields at FIG. 6 have respectively each been highlighted with one of four different hatch patterns in the example shown in FIG. 7. Whereas a single category ("Confidential") was selected or otherwise designated as the semantic category to be analyzed 170 to produce the analyzed print data 174 shown in FIG. 6, to produce the analyzed print data 174 shown in FIG. 7 in which four hatch patterns respectively indicate semantic patterns 152 respectively belonging to different semantic categories 156, the user at step 115 in the flowchart shown in FIG. 4 might have selected or otherwise designated four semantic categories to be analyzed 170. In a variation on the example of analyzed print data 174 shown in FIG. 7, the four hatch patterns respectively indicating matches for different semantic categories at FIG. 7 might be replaced with four different colors of highlighting to respectively indicate those same four categories. In such an example, at each location in unanalyzed print data 172 that corresponds to one of the four semantic categories to be analyzed 170 as designated by the user at step 115 in the flowchart shown in FIG. 4, semantic analyzer 120 might recognize the semantic pattern 152 as being associated with one of the four semantic categories to be analyzed 170, and might cause the print data at the corresponding location in analyzed print data 174 to be replaced with print data that will cause printing of text having the desired hatching pattern or highlighting color in accordance with a rule 154 associated with that semantic category 156 at database 150.

FIG. 8 is an example of a report 176 that might be output at step 119 in the flowchart shown in FIG. 4 when the unanalyzed print data 172 of FIG. 5 is subjected to analysis by semantic analyzer 120 at print data handler 110 in print data semantic analysis system 100 shown in FIG. 1. Report 176 shown in FIG. 8 might be produced in conjunction with censoring as indicated in the example shown in FIG. 6; that is, as there is no indication, in the report 176 shown in FIG. 8, of the category or categories to which each detected instance belongs, counting of instances for the purpose of producing the report 176 shown in FIG. 8 might be assumed to have taken place in the context of an example in which semantic categories 156 are not present at database 150, or in which the user designated a single semantic category to be analyzed 170 at step 115 in the flowchart shown in FIG. 4, as was the case for production of the analyzed print data 174 in the example shown in FIG. 6.

To produce the report 176 shown in FIG. 8, semantic identifier 122 of semantic analyzer 120 might recognize instances of text in unanalyzed print data 172 that are semantic patterns 152 associated with the category "Confidential", and semantic operator 124 of semantic analyzer 120 might, for each semantic pattern 152 so recognized, record at database 150 or other suitable location the number of instances of occurrence of that semantic pattern 152, together with any of various other information such as, for example, that which is indicated in the example shown in FIG. 8.

Note that where a report 176 such as that indicated in the example shown in FIG. 8 is produced, this may in some embodiments be the only thing which is output by semantic analyzer 120 at step 119 in the flowchart shown in FIG. 4. That is, in such an embodiment, rule(s) 154 associated with semantic pattern(s) 152 recognized as being associated with semantic category or categories to be analyzed 170 as entered automatically or as designated by a user at step 115 in the flowchart shown in FIG. 4 need not necessarily cause alteration of analyzed print data 174 relative to that which would have normally been output from print data handler 110 were no semantic analyzer 120 present. That is, in such an embodiment, rule(s) 154 associated with recognized semantic pattern(s) 152 might only cause such instances to be counted or otherwise recorded after the fashion of the example shown in FIG. 8, without necessarily causing any censoring or other alteration of analyzed print data 174.

Figure 9:
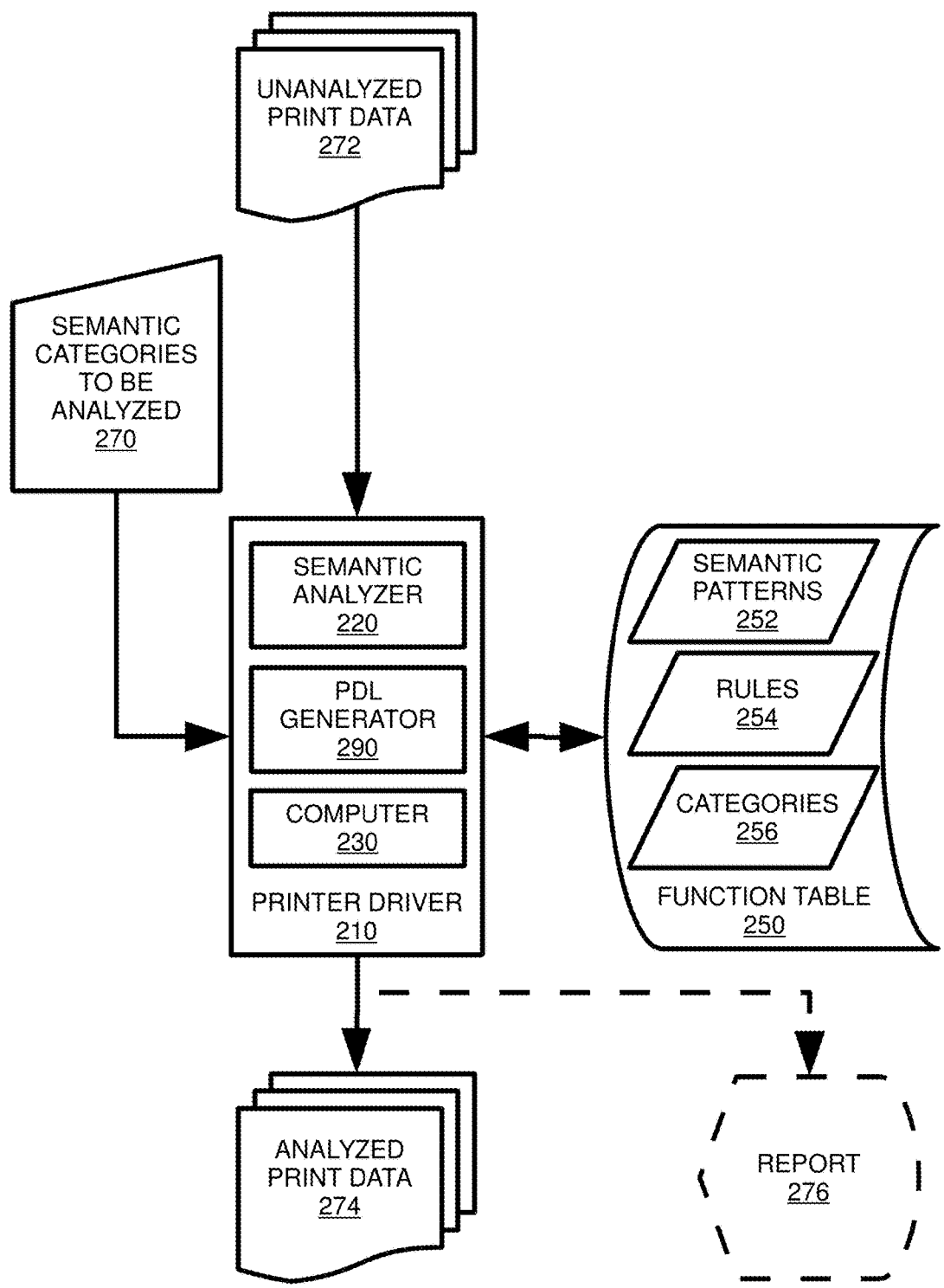
FIG. 9 is a functional block diagram of a print data semantic analysis system 200 in which semantic analyzer 220 and/or PDL generator 290 at printer driver 210 may use semantic patterns 252 and rules 254 incorporated into function(s) stored in function table 250 to analyze print data 272 with respect to semantic category or categories to be analyzed 270 among semantic category or categories 256 associated with function(s) at function table 250 in accordance with an embodiment of the present invention.

FIG. 9 is a functional block diagram of a print data semantic analysis system 200 in which semantic analyzer 220 and/or PDL generator 290 at printer driver 210 serving as print data handler 110 may use semantic patterns 252 and rules 254 incorporated into function(s) stored in function table 250 serving as database 150 to analyze print data 272 with respect to semantic category or categories to be analyzed 270 among semantic category or categories 256 associated with function(s) at function table 250 in accordance with an embodiment of the present invention. Print data semantic analysis system 200 shown in FIG. 9 being similar in many respects to print data semantic analysis system 100 shown in FIG. 1, like parts have been given like reference numerals and description thereof will be omitted.

Print data semantic analysis system 200 in the embodiment shown in FIG. 9 comprises printer driver 210 and function table 250. Here, print data handler 110 takes the form of a printer driver 210, and database 150 takes the form of a function table 250. In print data semantic analysis system 200 shown in FIG. 9, semantic analysis by semantic analyzer 220 is preferably carried out in addition to and/or in conjunction with creation of a print job by printer driver 210.

Printer driver 210 may include semantic analyzer 220, page description language (PDL) generator 290, and computer 230.

A computer similar to computer 930 shown in FIG. 2 may be employed as computer 230 of printer driver 210 in the embodiment shown at FIG. 9, in which case computer 230 at printer driver 210 in the embodiment shown at FIG. 9 might have processor 231, data storage 232, communication interface 236, input/output unit 237, and bus 235.

Printer driver 210 and function table 250 might, for example, be communicatively connected via bus 235, input/output unit 237, and/or communication interface 236. Communicative connection between printer driver 210 and function table 250, which preferably is such as to permit bidirectional communication therebetween but which at least allows retrieval by semantic analyzer 220 of semantic pattern(s) 252, rule(s) 254, and/or semantic category or categories 256 as needed by semantic analyzer 220 to carry out semantic analysis, might be carried out in wired and/or wireless fashion.

At print data semantic analysis system 200 in the embodiment shown in FIG. 9, semantic analyzer 220 at printer driver 210 may analyze semantic content in unanalyzed print data 272 by recognizing semantic pattern(s) 252 therein and carrying out operations according to rule(s) 254 that may differ depending on which among the semantic category or categories 256 associated with function(s) at function table 250 have been selected or otherwise designated as semantic category or categories to be analyzed 270, to produce analyzed print data 274 and/or report 276.

At print data semantic analysis system 200 in the embodiment shown in FIG. 9, because print data handler 110 takes the form of printer driver 210, this permits semantic analyzer 220 to carry out semantic analysis of unanalyzed print data 272 in addition to or in conjunction with processing of the sort that would normally be carried out by PDL generator 290 to create a print job even if no semantic analyzer 220 were present. Integration or combination of the functionality of semantic analyzer 220 with existing functionality possessed by PDL generator 290 for creation of a print job may facilitate implementation of semantic analysis by semantic analyzer 220, since PDL generator 290 may carry out parsing, interpreting, and/or converting of print data as PDL generator 290 creates a print job. In some embodiments, PDL generator 290 may generate PDL by way of PDL tokens. In some embodiments, the PDL generated by PDL generator 290 may contain printer instructions in the form of @PJL data, Open XML Paper Specification or other such XPS print data and/or ticket(s), Portable Document Format (PDF), Kyocera Page Description Language (KPDL) or other such specialized page description language or PostScript text data, PCL 5 or PCL XL or other such printer control language (PCL) instruction(s), user-defined function(s), and/or any other suitable page description language(s) (PDL(s)), and/or any other suitable format(s).

In the present embodiment, database 150 might conveniently take the form of a function table 250. At function table 250, semantic pattern(s) 252, rule(s) 254, and/or semantic category or categories 256 may be incorporated into and/or associated with function(s). During processing of unanalyzed print data 272 by PDL generator 290 for creation of a print job at printer driver 210, semantic analyzer 220 may cause PDL generator 290 to employ function(s) stored at function table 250 instead of the function(s) that would otherwise, i.e., in a system in which no semantic analyzer 220 were present and the print job was to be created normally without being subjected to semantic analysis, have been employed for creation of the print job. Thus, in such an embodiment, the function of semantic identifier 122 of semantic analyzer 120 in the embodiment shown in FIGS. 1 and 3 may be carried out when PDL generator 290 of printer driver 210 encounters a semantic pattern 152 during parsing of unanalyzed print data 172 for conversion into a print job, and the function of semantic operator 124 of semantic analyzer 120 in the embodiment shown in FIGS. 1 and 3 may be carried out when PDL generator 290 of printer driver 210 employs function(s) stored at function table 250 instead of the function(s) that would otherwise, i.e., in a system in which no semantic analyzer 220 were present and the print job was to be created normally without being subjected to semantic analysis, have been employed for creation of the print job.

In the present embodiment, unanalyzed print data 272 is preferably data, e.g., Graphics Device Interface (GDI) hooks and/or other such data output by application(s) for conversion into print job(s), based on which printer driver 210 may create a print job which is preferably output from printer driver 210 as analyzed print data 274. In the present embodiment, PDL generator 290 at printer driver 210 may cause the print job which is preferably created by printer driver 210 to contain instructions in any suitable page description language (PDL) or other suitable format. For example, in the present embodiment, the print job which is preferably created by printer driver 210 might contain or take the form of @PJL data, Open XML Paper Specification or other such XPS print data and/or ticket(s), Portable Document Format (PDF), Kyocera Page Description Language (KPDL) or other such specialized page description language or PostScript text data, PCL 5 or PCL XL or other such printer control language (PCL) instruction(s), user-defined function(s), and/or any other suitable format(s).

Printer driver 210 might, for example, take the form of a smartphone or other such mobile telephone, computer client or client terminal, computer server or server terminal, personal digital assistant (PDA), notebook computer, laptop computer, tablet computer, wearable computer, desktop computer or other such personal computer that may be equipped with a printer driver or other such print job creation functionality, or any other suitable computer-equipped device capable of carrying out print job creation and semantic analysis of unanalyzed print data 272.

In some embodiments, function(s) at function table 250 into which semantic pattern(s) 252, rule(s) 254, and/or semantic category or categories 256 have been incorporated may have a data structure such that, when the data structure is accessed by semantic analyzer 220 which in a preferred embodiment operates in conjunction with PDL generator 290, the data structure will permit semantic analyzer 220 and/or PDL generator 290 to recognize semantic pattern(s) 252 in unanalyzed print data 272 and carry out operations according to rule(s) 254 in correspondence to such recognized semantic pattern(s) 252. That is, association of rule(s) 254 with semantic pattern(s) 252 within such data structure may in some embodiments make it possible for semantic analyzer 220 and/or PDL generator 290 to perform action(s) defined by rule(s) 254 in correspondence to semantic pattern(s) 252.

In some embodiments, function(s) at function table 250 into which semantic pattern(s) 252, rule(s) 254, and/or semantic category or categories 256 have been incorporated may have a data structure such that, when the data structure is accessed by semantic analyzer 220 which in a preferred embodiment operates in conjunction with PDL generator 290, the data structure will permit semantic analyzer 220 and/or PDL generator 290 to carry out operations on semantic pattern(s) 252 in unanalyzed print data 272 in correspondence to the category or categories to which those semantic pattern(s) 252 belong. For example, in some embodiments it may be that operations are carried out only on semantic pattern(s) 252 that are associated with entered or otherwise designated semantic category or categories to be analyzed 270. That is, association of semantic pattern(s) 252 and semantic category or categories 256 within such data structure may in some embodiments make it possible for semantic analyzer 220 and/or PDL generator 290 to perform action(s) defined by rule(s) 254 in correspondence to semantic category or categories 256.

Function table 250, or any portion thereof, may be physically present at data storage 232 and/or any other suitable location(s) at printer driver 210. Function table 250, or any portion thereof, need not necessarily be physically present at printer driver 210, it being sufficient that function table 250, or portion(s) thereof, are accessible at least when needed by semantic analyzer 220. In some embodiments, printer driver 210 and/or semantic analyzer 220 may, for example, access function table 250 or any portion thereof by way of input/output unit 237 and/or communication interface 236 of computer 230.

Figure 10:
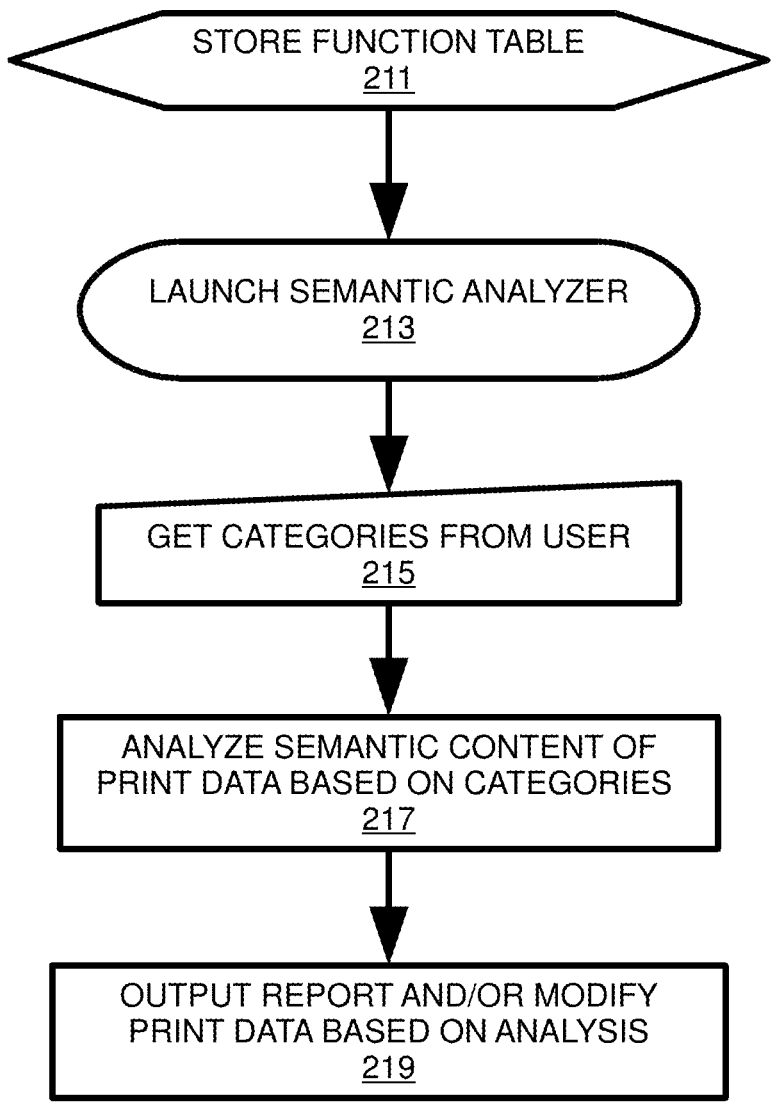
FIG. 10 is a flowchart showing flow of processing that might take place at printer driver 210 in print data semantic analysis system 200 shown in FIG. 9.

Referring to FIG. 10, flow of processing such as might take place at printer driver 210 in print data semantic analysis system 200 shown in FIG. 9 will now be described.

At print data semantic analysis system 200 in accordance with the embodiment shown at FIG. 9, semantic analyzer 220 and/or PDL generator 290 at printer driver 210 may use semantic patterns 252 and rules 254 incorporated into function(s) stored in function table 250 to analyze print data 272 with respect to semantic category or categories to be analyzed 270.

At step 211 in the flowchart shown in FIG. 10, semantic pattern(s) 252, rule(s) 254, and/or semantic category or categories 256 may be stored in mutually associated fashion as a result of being incorporated into and/or associated with function(s) at function table 250. In one embodiment, semantic pattern(s) 252, rule(s) 254, and/or semantic category or categories 256 are preferably previously stored in the form of function(s) at function table 250 via a settings web page, utility, application, or the like that in some embodiments might require entry of a password by an administrator of print data semantic analysis system 200.

At step 213 in the flowchart shown in FIG. 10, a user at printer driver 210 might operate a touchscreen, mouse, keyboard, and/or other such input device of a user interface at input/output unit 237 of computer 230 to launch semantic analyzer 220 at printer driver 210.

Printer driver 210 may be hardware, firmware, and/or software, or any combination of hardware, firmware, and/or software. In the present embodiment, in addition to or in conjunction with semantic analysis of unanalyzed print data 272 by semantic analyzer 220 to produce analyzed print data 274, printer driver 210 may, during the course of creation of a print job, cause unanalyzed print data 272 to be converted such that analyzed print data 274 is in a format which is different from that of unanalyzed print data 272. For example, PDL generator 290 of printer driver 210 may cause unanalyzed print data 272 to be converted to page description language (PDL) format. That is, semantic analyzer 220 of the present embodiment may be conveniently implemented in conjunction with the conversion of print data to PDL that might typically place as part of normal processing, i.e., processing of the sort that might be carried out even where no semantic analyzer 220 is present at printer driver 210, as print data is prepared for printing.

At step 215 in the flowchart shown in FIG. 10, semantic analyzer 220 might, by way of a display or other such output device of a user interface at input/output unit 237 of computer 230, prompt the user to enter semantic category or categories to be analyzed 270. In response to being prompted in this fashion, the user at printer driver 210 might operate a touchscreen, mouse, keyboard, and/or other such input device of a user interface at input/output unit 237 of computer 230 to select or otherwise designate semantic category or categories to be analyzed 270 from among the semantic category or categories 256 associated with function(s) at function table 250.

In some embodiments, where there is no need for user input of semantic category or categories to be analyzed 270 at step 215 in the flowchart shown in FIG. 10, step 215 may be omitted. For example, in some embodiments, standard or default values might be automatically employed as semantic category or categories to be analyzed 270. Or in an embodiment that does not employ semantic categories 256, or in an embodiment in which there is only a single category 256 associated with function(s) at function table 250 and all semantic pattern(s) 252 and rule(s) 254 belong to this single category 256, or in an embodiment in which all categories 256 associated with function(s) at function table 250 are always to be employed for semantic analysis, there may be no need for entry, either manually by a user or automatically based on default or standard value(s), of semantic category or categories to be analyzed 270, since in such an embodiment it may already be known that all semantic pattern(s) 252 and rule(s) 254, or any standard or default subset thereof, are to be employed for semantic analysis of unanalyzed print data 272. Such automatic operation of semantic analyzer 220 may be particularly desirable in embodiments in which semantic analyzer 220 is employed for its ability to censor all or any portion of the print data that is handled by an organization, in which case storage and/or configuration of semantic pattern(s) 252, rule(s) 254, and/or semantic category or categories 256 incorporated into and/or associated with function(s) at function table 250 may preferably require entry of a password, for example, so that such storage and/or configuration might be carried out only by an administrator, for example.

Conversely, in some embodiments it may be possible at step 215 in the flowchart shown in FIG. 10 for a user to alternatively or additionally freely enter or otherwise configure semantic pattern(s) 252, rule(s) 254, and/or semantic category or categories 256 for incorporation into function(s) at function table 250. That is, in such an embodiment, the storage of semantic pattern(s) 252, rule(s) 254, and/or semantic category or categories 256 incorporated into and/or associated with function(s) at function table 250 which was described above with reference to step 211 might take place, e.g., interactively via a user interface at input/output unit 237 of computer 230, at step 215. Or in another embodiment, storage of semantic pattern(s) 252, rule(s) 254, and/or semantic category or categories 256 incorporated into and/or associated with function(s) at function table 250 might take place as described with reference to step 211 but be capable of modification, e.g., interactively via a user interface at input/output unit 237 of computer 230, at step 215.

In embodiments in which the user is able at step 215 to configure or modify configuration of semantic pattern(s) 252, rule(s) 254, and/or semantic category or categories 256 incorporated into and/or associated with function(s) at function table 250, semantic analyzer 220 might cause semantic pattern(s) 252, rule(s) 254, and/or semantic category or categories 256 currently stored in the form of function(s) at function table 250 (if any) to be displayed at a display or other such output device of a user interface at input/output unit 237 of computer 230, and might prompt the user to enter or select semantic pattern(s) 252, rule(s) 254, and/or semantic category or categories 256 for storage in the form of function(s) at function table 250 before, in an embodiment in which categories are employed for semantic analysis and it is necessary or desirable (e.g., because there is more than one category, all categories are not automatically employed for semantic analysis, and standard or default values for semantic category or categories to be analyzed 270 are not automatically entered), prompting the user to enter or otherwise designate semantic category or categories to be analyzed 270 from among the semantic category or categories 256 associated with function(s) at function table 250.

In some embodiments, configuration of semantic pattern(s) 252, rule(s) 254, and/or semantic category or categories 256 incorporated into and/or associated with function(s) at function table 250 might take place in two stages. In such an embodiment, in a first stage of configuration of function table 250, semantic pattern(s) 152, rule(s) 154, and/or semantic category or categories 156 might be stored in a database 150 as was described above with reference to print data semantic analysis system 100 shown in FIG. 4, except that in the present embodiment semantic pattern(s) 252, rule(s) 254, and/or semantic category or categories 256 need not necessarily be stored in mutually associated fashion. This first stage might, for example, take place at step 211 in the flowchart shown in FIG. 10. In such an embodiment, in a second stage of configuration of function table 250, the semantic pattern(s) 152, rule(s) 154, and/or semantic category or categories 156 stored in database 150 in the first stage might be organized, assembled, or otherwise incorporated into function(s) for storage in function table 250.

Regardless of whether configuration of function table 250 takes place indirectly in two stages, e.g., at steps 211 and 215 in the flowchart shown in FIG. 10, or directly in one stage, e.g., at step 211 in the flowchart shown in FIG. 10, upon completion of configuration of function table 250, semantic pattern(s) 252, rule(s) 254, and/or semantic category or categories 256 will have been stored in mutually associated fashion by virtue of their having been incorporated into and/or associated with function(s) at function table 250. In some embodiments, the function(s) at function table 250 may themselves contain, incorporate, or otherwise reflect the desired mutual association of semantic pattern(s) 252, rule(s) 254, and/or semantic category or categories 256. In some embodiments, the function(s) at function table 250 might themselves contain only semantic pattern(s) 252 to be recognized during semantic analysis and, in mutual association therewith, the rule(s) 254 to be carried out when such semantic pattern(s) 252 are recognized, but even in such an embodiment, to the extent that semantic category or categories 256 are employed (e.g., because there is more than one category, all categories are not automatically employed for semantic analysis, and standard or default values for semantic category or categories to be analyzed 270 are not automatically entered), such semantic category or categories 256, and the manner in which such semantic category or categories 256 are associated with semantic pattern(s) 252 and rule(s) 254, will preferably be stored at function table 250 or another suitable location accessible by semantic analyzer 220. In this way, in some embodiments, semantic pattern(s) 252, rule(s) 254, and/or semantic category or categories 256 may be stored in mutually associated fashion at function table 250 and/or another suitable location accessible by semantic analyzer 220.

At step 217 in the flowchart shown in FIG. 10, semantic analyzer 220 may analyze semantic content in unanalyzed print data 272 by recognizing semantic pattern(s) 252 therein and carrying out operations according to rule(s) 254 associated with recognized semantic pattern(s) 252, thus allowing operation(s) defined by rule(s) 254 to be carried out in correspondence to semantic pattern(s) 252.

More specifically, during preparation of a print job by PDL generator 290, as PDL generator 290 parses unanalyzed print data 272 and generates PDL tokens or other such PDL units in correspondence to the content of unanalyzed print data 272, semantic analyzer 220 may cause PDL generator 290 to employ function(s) stored at function table 250 instead of the function(s) that would otherwise, i.e., in a system in which no semantic analyzer 220 were present and the print job was to be created normally without being subjected to semantic analysis, have been employed for creation of the print job. Thus, in such an embodiment, the function of semantic identifier 122 of semantic analyzer 120 in the embodiment shown in FIGS. 1 and 3 may be carried out when PDL generator 290 of printer driver 210 encounters a semantic pattern 152 during parsing of unanalyzed print data 172 for conversion into a print job, and the function of semantic operator 124 of semantic analyzer 120 in the embodiment shown in FIGS. 1 and 3 may be carried out when PDL generator 290 of printer driver 210 employs function(s) stored at function table 250 instead of the function(s) that would otherwise, i.e., in a system in which no semantic analyzer 220 were present and the print job was to be created normally without being subjected to semantic analysis, have been employed for creation of the print job.

Because the function(s) at function table 250 incorporate semantic pattern(s) 252 and rule(s) 254, when semantic analyzer 220 causes PDL generator 290 to employ function(s) from function table 250 instead of the function(s) that would otherwise have been employed by PDL generator 290, this effectively causes operation(s) defined by rule(s) 254 to be carried out in correspondence to semantic pattern(s) 252.

And in an embodiment in which semantic category or categories 256 are employed (e.g., because there is more than one category, all categories are not automatically employed for semantic analysis, and standard or default values for semantic category or categories to be analyzed 270 are not automatically entered), because such replacement of function(s) by semantic analyzer 220 may moreover be carried out only with respect to semantic category or categories to be analyzed 270 as entered or otherwise designated, e.g., interactively via a user interface at input/output unit 237 of computer 230, at step 215, such semantic analysis may in such embodiments moreover be carried out in correspondence to semantic category or categories to be analyzed 270 as designated at step 215.

Thus, in an embodiment in which categories are employed, semantic analyzer 220 might only recognize semantic pattern(s) 252 that are associated with semantic category or categories to be analyzed 270 as entered or otherwise designated at step 215, and might ignore (i.e., not perform operation(s) defined by rule(s) 254 associated with) semantic pattern(s) 252 that do not belong to, i.e., are not associated with, such semantic category or categories to be analyzed 270.

At step 219 in the flowchart shown in FIG. 10, the analyzed print data 274 and/or report 276 that is produced when semantic analyzer 220 carries out operation(s) defined by rule(s) 254 at step 217 may be output by way of a printer, display, or other such output device of a user interface at input/output unit 237 of computer 230 and/or at a remote location via communication interface 236, and/or may be output in the form of a file which might be sent to a remote location via communication interface 236 and/or stored at data storage 232 and/or stored via a USB thumb drive or other such removable storage device which might, for example, be inserted into a removable storage interface at data storage 232 or input/output unit 237 of computer 230.

In the present embodiment, in addition to and/or in conjunction with the semantic analysis that is carried out at step 217 in the flowchart shown in FIG. 10, parsing, filtering, and/or other such processing of print data by PDL generator 290 may cause unanalyzed print data 272 to be converted such that analyzed print data 274 is in a format different from that of unanalyzed print data 272. That is, in the present embodiment, in addition to and/or in conjunction with the semantic analysis carried out at step 217, PDL generator 290 of printer driver 210 may cause unanalyzed print data 272 to be converted to page description language (PDL) or other such print job format.

Figure 11:
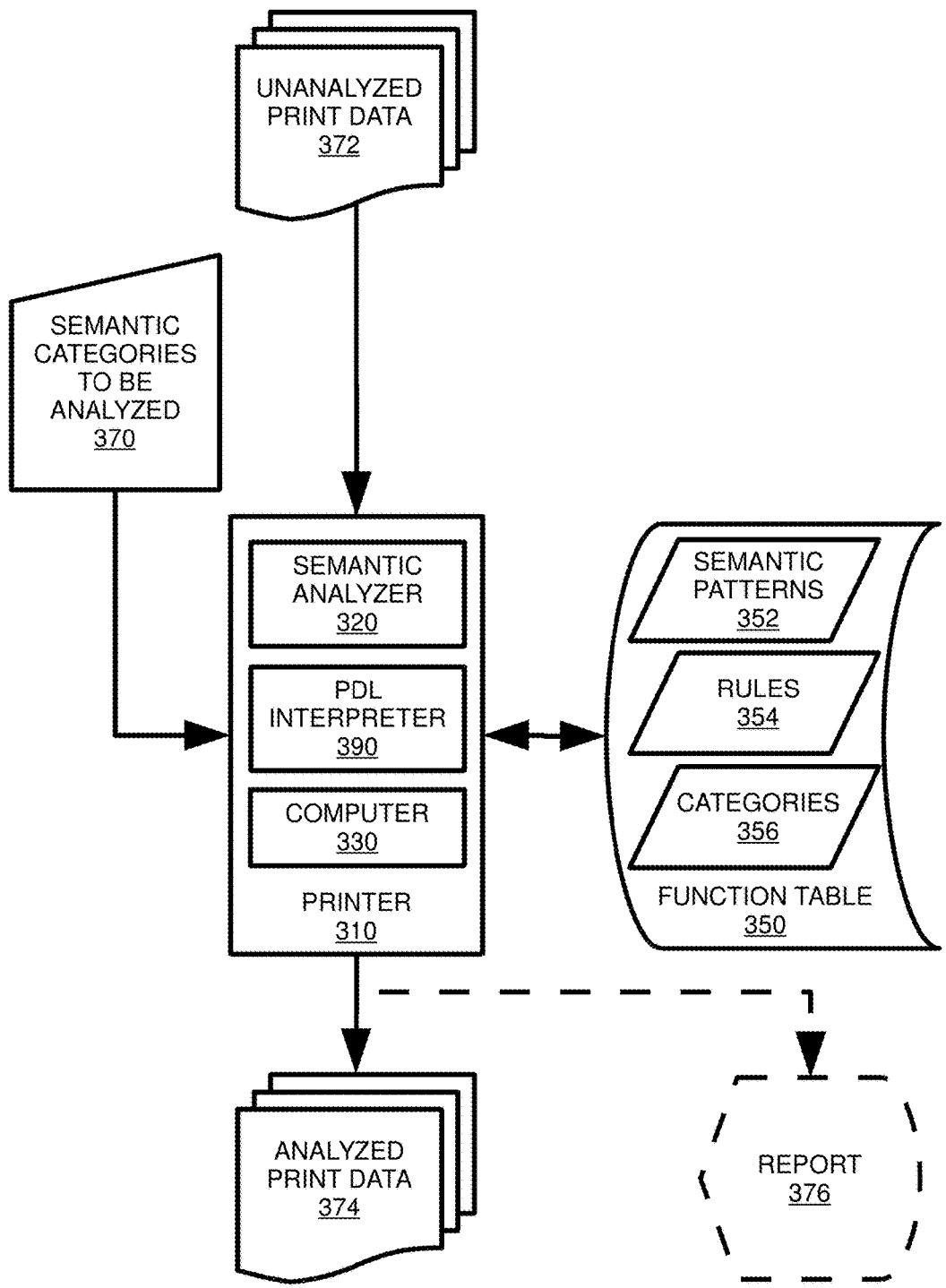
FIG. 11 is a functional block diagram of a print data semantic analysis system 300 in which semantic analyzer 320 and/or PDL interpreter 390 at printer 310 may use semantic patterns 352 and rules 354 incorporated into function(s) stored in function table 350 to analyze print data 372 with respect to semantic category or categories to be analyzed 370 among semantic category or categories 356 associated with function(s) at function table 350 in accordance with an embodiment of the present invention.

FIG. 11 is a functional block diagram of a print data semantic analysis system 300 in which semantic analyzer 320 and/or PDL interpreter 390 at printer 310 serving as print data handler 110 may use semantic patterns 352 and rules 354 incorporated into function(s) stored in function table 350 serving as database 150 to analyze print data 372 with respect to semantic category or categories to be analyzed 370 among semantic category or categories 356 associated with function(s) at function table 350 in accordance with an embodiment of the present invention. Print data semantic analysis system 300 shown in FIG. 11 being similar in many respects to print data semantic analysis system 100 shown in FIG. 1, like parts have been given like reference numerals and description thereof will be omitted.

Print data semantic analysis system 300 in the embodiment shown in FIG. 11 comprises printer 310 and function table 350. Here, print data handler 110 takes the form of a printer 310, and database 150 takes the form of a function table 350. In print data semantic analysis system 300 shown in FIG. 11, semantic analysis by semantic analyzer 320 is preferably carried out in addition to and/or in conjunction with creation of a raster image by printer 310.

Printer 310 may include semantic analyzer 320, page description language (PDL) interpreter 390, and computer 330.

A computer similar to computer 930 shown in FIG. 4 may be employed as computer 330 of printer 310 in the embodiment shown at FIG. 11, in which case computer 330 at printer 310 in the embodiment shown at FIG. 11 might have processor 331, data storage 332, communication interface 336, input/output unit 337, and bus 335.

Printer 310 and function table 350 might, for example, be communicatively connected via bus 335, input/output unit 337, and/or communication interface 336. Communicative connection between printer 310 and function table 350, which preferably is such as to permit bidirectional communication therebetween but which at least allows retrieval by semantic analyzer 320 of semantic pattern(s) 352, rule(s) 354, and/or semantic category or categories 356 as needed by semantic analyzer 320 to carry out semantic analysis, might be carried out in wired and/or wireless fashion.

At print data semantic analysis system 300 in the embodiment shown in FIG. 11, semantic analyzer 320 at printer 310 may analyze semantic content in unanalyzed print data 372 by recognizing semantic pattern(s) 352 therein and carrying out operations according to rule(s) 354 that may differ depending on which among the semantic category or categories 356 associated with function(s) at function table 350 have been selected or otherwise designated as semantic category or categories to be analyzed 370, to produce analyzed print data 374 and/or report 376.

At print data semantic analysis system 300 in the embodiment shown in FIG. 11, because print data handler 110 takes the form of printer 310, this permits semantic analyzer 320 to carry out semantic analysis of unanalyzed print data 372 in addition to or in conjunction with processing of the sort that would normally be carried out by PDL interpreter 390 to create a raster image even if no semantic analyzer 320 were present. Integration or combination of the functionality of semantic analyzer 320 with existing functionality possessed by PDL interpreter 390 for creation of a raster image may facilitate implementation of semantic analysis by semantic analyzer 320, since PDL interpreter 390 may carry out parsing, interpreting, and/or converting of print data as PDL interpreter 390 creates a raster image.

In the present embodiment, database 150 might conveniently take the form of a function table 350. At function table 350, semantic pattern(s) 352, rule(s) 354, and/or semantic category or categories 356 may be incorporated into and/or associated with function(s). During processing of unanalyzed print data 372 by PDL interpreter 390 for creation of a raster image at printer 310, semantic analyzer 320 may cause PDL interpreter 390 to employ function(s) stored at function table 350 instead of the function(s) that would otherwise, i.e., in a system in which no semantic analyzer 320 were present and the raster image was to be created normally without being subjected to semantic analysis, have been employed for creation of the raster image. Thus, in such an embodiment, the function of semantic identifier 122 of semantic analyzer 120 in the embodiment shown in FIGS. 1 and 3 may be carried out when PDL generator 390 of printer driver 310 encounters a semantic pattern 152 during parsing of unanalyzed print data 172 for conversion into a print job, and the function of semantic operator 124 of semantic analyzer 120 in the embodiment shown in FIGS. 1 and 3 may be carried out when PDL generator 390 of printer driver 310 employs function(s) stored at function table 350 instead of the function(s) that would otherwise, i.e., in a system in which no semantic analyzer 320 were present and the print job was to be created normally without being subjected to semantic analysis, have been employed for creation of the print job.

In the present embodiment, unanalyzed print data 372 is preferably data, e.g., a print job containing instructions in any suitable page description language(s) (PDL(s)) or other suitable format(s) for conversion into a raster image, based on which a raster image processor (RIP) or other suitable component at printer 310 may create a raster image which is preferably output therefrom as analyzed print data 374. In the present embodiment, PDL interpreter 390 at printer 310 may cause the raster image which is preferably created by printer 310 to contain binary data that may be suitable for direct input to printhead driver(s).

Printer 310 might, for example, take the form of a standalone printer, print server, raster image processor (RIP) server, or similar device that may be equipped with a raster image processor (RIP) or other such imaging unit or image rendering functionality, or any other suitable computer-equipped device capable of carrying out raster image creation and semantic analysis of unanalyzed print data 372. Although printer 310 of the present embodiment is preferably capable of creating a raster image, there is no objection to embodiments in which print data may be made available to the imaging unit of printer 310 in raster image form by a graphical device interface (GDI) and/or by a separate RIP, for example.

Although for purposes of the present embodiment it may only be required that printer 310 include functionality for carrying out semantic analysis of unanalyzed print data 372 preferably in conjunction with creation of a raster image, there is no objection to employment of a printer 310 which is capable of producing printed output. Such a printer 310 might in some embodiments take the form of a black-and-white (or monochrome) printer or color printer, or might take the form of a multifunction peripheral (MFP) in which printer functionality is combined with functionality or functionalities of one or more other devices that might include image scanner, facsimile machine, copy machine, and/or document storage device. Depending on the technology employed, such a printer 310 might, for example, employ a laser, inkjet, and/or dot-matrix printhead to carry out printing.

In some embodiments, an imaging unit at printer 310 may be configured to carry out printing of print data in the form of print jobs received via communication interface 336 of computer 330. In some embodiments, print data might be received at the printer via communication interface 336 and/or data storage 332 of computer 330 or via a USB thumb drive or other such removable storage device which might, for example, be inserted into a removable storage interface at data storage 332 or input/output unit 337 of computer 330.

In some embodiments, function(s) at function table 350 into which semantic pattern(s) 352, rule(s) 354, and/or semantic category or categories 356 have been incorporated may have a data structure such that, when the data structure is accessed by semantic analyzer 320 which in a preferred embodiment operates in conjunction with PDL interpreter 390, the data structure will permit semantic analyzer 320 and/or PDL interpreter 390 to recognize semantic pattern(s) 352 in unanalyzed print data 372 and carry out operations according to rule(s) 354 in correspondence to such recognized semantic pattern(s) 352. That is, association of rule(s) 354 with semantic pattern(s) 352 within such data structure may in some embodiments make it possible for semantic analyzer 320 and/or PDL interpreter 390 to perform action(s) defined by rule(s) 354 in correspondence to semantic pattern(s) 352.

In some embodiments, function(s) at function table 350 into which semantic pattern(s) 352, rule(s) 354, and/or semantic category or categories 356 have been incorporated may have a data structure such that, when the data structure is accessed by semantic analyzer 320 which in a preferred embodiment operates in conjunction with PDL interpreter 390, the data structure will permit semantic analyzer 320 and/or PDL interpreter 390 to carry out operations on semantic pattern(s) 352 in unanalyzed print data 372 in correspondence to the category or categories to which those semantic pattern(s) 352 belong. For example, in some embodiments it may be that operations are carried out only on semantic pattern(s) 352 that are associated with entered or otherwise designated semantic category or categories to be analyzed 370. That is, association of semantic pattern(s) 352 and semantic category or categories 356 within such data structure may in some embodiments make it possible for semantic analyzer 320 and/or PDL interpreter 390 to perform action(s) defined by rule(s) 354 in correspondence to semantic category or categories 356.

Function table 350, or any portion thereof, may be physically present at data storage 332 and/or any other suitable location(s) at printer 310. Function table 350, or any portion thereof, need not necessarily be physically present at printer 310, it being sufficient that function table 350, or portion(s) thereof, are accessible at least when needed by semantic analyzer 320. In some embodiments, printer 310 and/or semantic analyzer 320 may, for example, access function table 350 or any portion thereof by way of input/output unit 337 and/or communication interface 336 of computer 330.

Figure 12:
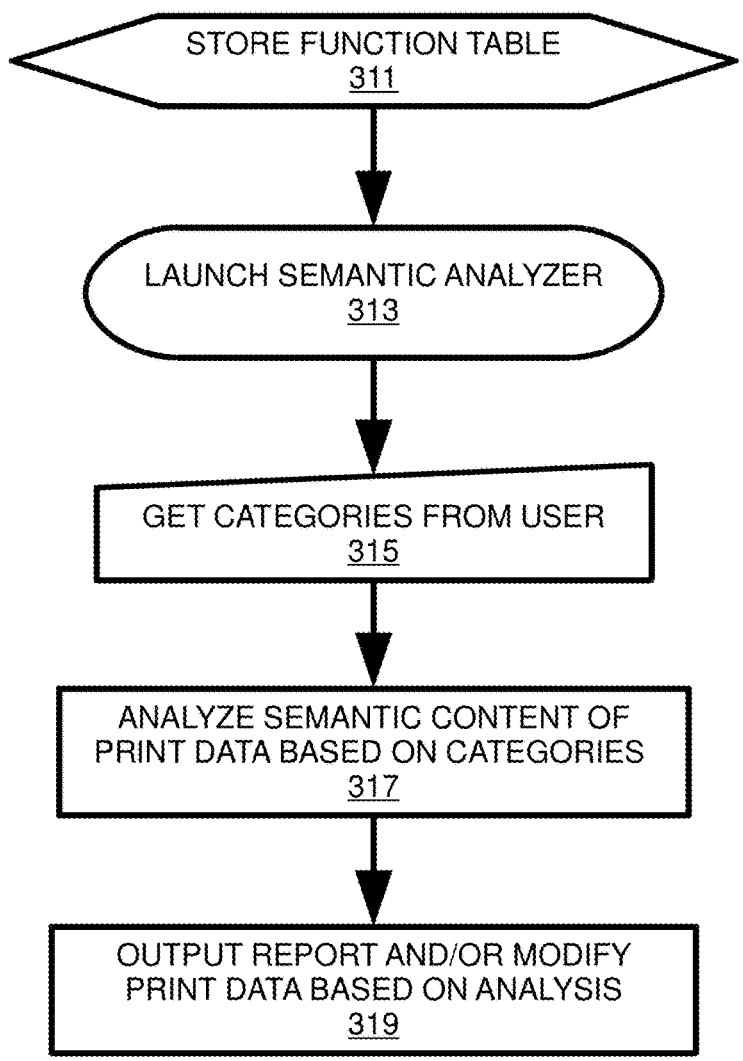
FIG. 12 is a flowchart showing flow of processing that might take place at printer 310 in print data semantic analysis system 300 shown in FIG. 11.

Referring to FIG. 12, flow of processing such as might take place at printer 310 in print data semantic analysis system 300 shown in FIG. 11 will now be described.

At print data semantic analysis system 300 in accordance with the embodiment shown at FIG. 11, semantic analyzer 320 and/or PDL interpreter 390 at printer 310 may use semantic patterns 352 and rules 354 incorporated into function(s) stored in function table 350 to analyze print data 372 with respect to semantic category or categories to be analyzed 370.

At step 311 in the flowchart shown in FIG. 12, semantic pattern(s) 352, rule(s) 354, and/or semantic category or categories 356 may be stored in mutually associated fashion as a result of being incorporated into and/or associated with function(s) at function table 350. In one embodiment, semantic pattern(s) 352, rule(s) 354, and/or semantic category or categories 356 are preferably previously stored in the form of function(s) at function table 350 via a settings web page, utility, application, or the like that in some embodiments might require entry of a password by an administrator of print data semantic analysis system 300.

At step 313 in the flowchart shown in FIG. 12, a user at printer 310 might operate a touchscreen, mouse, keyboard, and/or other such input device of a user interface at input/output unit 337 of computer 330 to launch semantic analyzer 320 at printer 310.

Printer 310, and in particular the PDL interpreter 390 thereof, may be hardware, firmware, and/or software, or any combination of hardware, firmware, and/or software. In the present embodiment, in addition to or in conjunction with semantic analysis of unanalyzed print data 372 by semantic analyzer 320 to produce analyzed print data 374, printer 310 may, during the course of creation of a raster image, cause unanalyzed print data 372 to be converted such that analyzed print data 374 is in a format which is different from that of unanalyzed print data 372. For example, PDL interpreter 390 of printer 310 may cause unanalyzed print data 372 to be converted to raster image format. That is, semantic analyzer 320 of the present embodiment may be conveniently implemented in conjunction with the conversion of print data to a raster image that might typically place as part of normal processing, i.e., processing of the sort that might be carried out even where no semantic analyzer 320 is present at printer 310, as print data is prepared for printing.

At step 315 in the flowchart shown in FIG. 12, semantic analyzer 320 might, by way of a display or other such output device of a user interface at input/output unit 337 of computer 330, prompt the user to enter semantic category or categories to be analyzed 370. In response to being prompted in this fashion, the user at printer 310 might operate a touchscreen, mouse, keyboard, and/or other such input device of a user interface at input/output unit 337 of computer 330 to select or otherwise designate semantic category or categories to be analyzed 370 from among the semantic category or categories 356 associated with function(s) at function table 350.

In some embodiments, where there is no need for user input of semantic category or categories to be analyzed 370 at step 315 in the flowchart shown in FIG. 12, step 315 may be omitted. For example, in some embodiments, standard or default values might be automatically employed as semantic category or categories to be analyzed 370. Or in an embodiment that does not employ semantic categories 356, or in an embodiment in which there is only a single category 356 associated with function(s) at function table 350 and all semantic pattern(s) 352 and rule(s) 354 belong to this single category 356, or in an embodiment in which all categories 356 associated with function(s) at function table 350 are always to be employed for semantic analysis, there may be no need for entry, either manually by a user or automatically based on default or standard value(s), of semantic category or categories to be analyzed 370, since in such an embodiment it may already be known that all semantic pattern(s) 352 and rule(s) 354, or any standard or default subset thereof, are to be employed for semantic analysis of unanalyzed print data 372. Such automatic operation of semantic analyzer 320 may be particularly desirable in embodiments in which semantic analyzer 320 is employed for its ability to censor all or any portion of the print data that is handled by an organization, in which case storage and/or configuration of semantic pattern(s) 352, rule(s) 354, and/or semantic category or categories 356 incorporated into and/or associated with function(s) at function table 350 may preferably require entry of a password, for example, so that such storage and/or configuration might be carried out only by an administrator, for example.

Conversely, in some embodiments it may be possible at step 315 in the flowchart shown in FIG. 12 for a user to alternatively or additionally freely enter or otherwise configure semantic pattern(s) 352, rule(s) 354, and/or semantic category or categories 356 for incorporation into function(s) at function table 350. That is, in such an embodiment, the storage of semantic pattern(s) 352, rule(s) 354, and/or semantic category or categories 356 incorporated into and/or associated with function(s) at function table 350 which was described above with reference to step 311 might take place, e.g., interactively via a user interface at input/output unit 337 of computer 330, at step 315. Or in another embodiment, storage of semantic pattern(s) 352, rule(s) 354, and/or semantic category or categories 356 incorporated into and/or associated with function(s) at function table 350 might take place as described with reference to step 311 but be capable of modification, e.g., interactively via a user interface at input/output unit 337 of computer 330, at step 315.

In embodiments in which the user is able at step 315 to configure or modify configuration of semantic pattern(s) 352, rule(s) 354, and/or semantic category or categories 356 incorporated into and/or associated with function(s) at function table 350, semantic analyzer 320 might cause semantic pattern(s) 352, rule(s) 354, and/or semantic category or categories 356 currently stored in the form of function(s) at function table 350 (if any) to be displayed at a display or other such output device of a user interface at input/output unit 337 of computer 330, and might prompt the user to enter or select semantic pattern(s) 352, rule(s) 354, and/or semantic category or categories 356 for storage in the form of function(s) at function table 350 before, in an embodiment in which categories are employed for semantic analysis and it is necessary or desirable (e.g., because there is more than one category, all categories are not automatically employed for semantic analysis, and standard or default values for semantic category or categories to be analyzed 370 are not automatically entered), prompting the user to enter or otherwise designate semantic category or categories to be analyzed 370 from among the semantic category or categories 356 associated with function(s) at function table 350.

In some embodiments, configuration of semantic pattern(s) 352, rule(s) 354, and/or semantic category or categories 356 incorporated into and/or associated with function(s) at function table 350 might take place in two stages. In such an embodiment, in a first stage of configuration of function table 350, semantic pattern(s) 152, rule(s) 154, and/or semantic category or categories 156 might be stored in a database 150 as was described above with reference to print data semantic analysis system 100 shown in FIG. 4, except that in the present embodiment semantic pattern(s) 352, rule(s) 354, and/or semantic category or categories 356 need not necessarily be stored in mutually associated fashion. This first stage might, for example, take place at step 311 in the flowchart shown in FIG. 12. In such an embodiment, in a second stage of configuration of function table 350, the semantic pattern(s) 152, rule(s) 154, and/or semantic category or categories 156 stored in database 150 in the first stage might be organized, assembled, or otherwise incorporated into function(s) for storage in function table 350.

Regardless of whether configuration of function table 350 takes place indirectly in two stages, e.g., at steps 311 and 315 in the flowchart shown in FIG. 12, or directly in one stage, e.g., at step 311 in the flowchart shown in FIG. 12, upon completion of configuration of function table 350, semantic pattern(s) 352, rule(s) 354, and/or semantic category or categories 356 will have been stored in mutually associated fashion by virtue of their having been incorporated into and/or associated with function(s) at function table 350. In some embodiments, the function(s) at function table 350 may themselves contain, incorporate, or otherwise reflect the desired mutual association of semantic pattern(s) 352, rule(s) 354, and/or semantic category or categories 356. In some embodiments, the function(s) at function table 350 might themselves contain only semantic pattern(s) 352 to be recognized during semantic analysis and, in mutual association therewith, the rule(s) 354 to be carried out when such semantic pattern(s) 352 are recognized, but even in such an embodiment, to the extent that semantic category or categories 356 are employed (e.g., because there is more than one category, all categories are not automatically employed for semantic analysis, and standard or default values for semantic category or categories to be analyzed 370 are not automatically entered), such semantic category or categories 356, and the manner in which such semantic category or categories 356 are associated with semantic pattern(s) 352 and rule(s) 354, will preferably be stored at function table 350 or another suitable location accessible by semantic analyzer 320. In this way, in some embodiments, semantic pattern(s) 352, rule(s) 354, and/or semantic category or categories 356 may be stored in mutually associated fashion at function table 350 and/or another suitable location accessible by semantic analyzer 320.

In some embodiments, especially where it is inconvenient or impractical for a user to interact directly with printer 310, any or all of steps 311, 313, and 315 might be carried out by way of a printer driver in similar fashion as was described above with reference to steps 211, 213, and 215 in the flowchart shown in FIG. 10. That is, in some embodiments, semantic analyzer 320 might, e.g., interactively via a user interface at input/output unit 337 of computer 330, configure function table 350 and/or obtain semantic category or categories to be analyzed 370 in the context of launch not of semantic analyzer 320 at printer 310 as at step 313 in the flowchart shown in FIG. 12 but in the context of launch of semantic analyzer 220 at printer driver 210 as at step 213 in the flowchart shown in FIG. 10. In such an embodiment, instructions to cause the PDL interpreter 390 or other suitable component at printer 310 to cause semantic analysis to be carried out at step 317 as desired might be passed to the PDL interpreter 390 or other suitable component at printer 310 via instructions written to a print job by PDL generator 290 or other suitable component of printer driver 210. Such instructions might be in take the form of @PJL data, Open XML Paper Specification or other such XPS print data and/or ticket(s), Portable Document Format (PDF), Kyocera Page Description Language (KPDL) or other such specialized page description language or PostScript text data, PCL 5 or PCL XL or other such printer control language (PCL) instruction(s), user-defined function(s), and/or any other suitable page description language(s) (PDL(s)), and/or any other suitable format(s) that might be capable of interpretation by the PDL interpreter 390 or other suitable component at printer 310. That is, in such an embodiment, print data 274 output by a printer driver 210 in the form of a print job might serve as print data 372 for input to a printer 310, regardless of whether semantic analysis is performed by the printer driver 210. In such an embodiment, where semantic analysis is to be carried out serially such that analyzed print data 274 resulting from analysis performed by printer driver 210 at print data semantic analysis system 200 serves as unanalyzed print data 372 for analysis to be performed by printer 310 at print data semantic analysis system 300, it is preferred that a flag be set or that some other suitable method be employed by printer driver 210 to communicate to printer 310 which location(s) have already been subjected to semantic analysis and which location(s) have not yet been subjected to semantic analysis, so as to preferably avoid duplicative and/or unnecessary processing by semantic analyzer 320 of printer 310 at location(s) already subjected to semantic analysis by semantic analyzer 220 of printer driver 210.

At step 317 in the flowchart shown in FIG. 12, semantic analyzer 320 may analyze semantic content in unanalyzed print data 372 by recognizing semantic pattern(s) 352 therein and carrying out operations according to rule(s) 354 associated with recognized semantic pattern(s) 352, thus allowing operation(s) defined by rule(s) 354 to be carried out in correspondence to semantic pattern(s) 352.

More specifically, during preparation of a raster image by PDL interpreter 390, as PDL interpreter 390 parses unanalyzed print data 372 and generates a raster image in correspondence to the content of unanalyzed print data 372, semantic analyzer 320 may cause PDL interpreter 390 to employ function(s) stored at function table 350 instead of the function(s) that would otherwise, i.e., in a system in which no semantic analyzer 320 were present and the raster image was to be created normally without being subjected to semantic analysis, have been employed for creation of the raster image. Thus, in such an embodiment, the function of semantic identifier 122 of semantic analyzer 120 in the embodiment shown in FIGS. 1 and 3 may be carried out when PDL generator 390 of printer driver 310 encounters a semantic pattern 152 during parsing of unanalyzed print data 172 for conversion into a print job, and the function of semantic operator 124 of semantic analyzer 120 in the embodiment shown in FIGS. 1 and 3 may be carried out when PDL generator 390 of printer driver 310 employs function(s) stored at function table 350 instead of the function(s) that would otherwise, i.e., in a system in which no semantic analyzer 320 were present and the print job was to be created normally without being subjected to semantic analysis, have been employed for creation of the print job.

Because the function(s) at function table 350 incorporate semantic pattern(s) 352 and rule(s) 354, when semantic analyzer 320 causes PDL interpreter 390 to employ function(s) from function table 350 instead of the function(s) that would otherwise have been employed by PDL interpreter 390, this effectively causes operation(s) defined by rule(s) 354 to be carried out in correspondence to semantic pattern(s) 352.

And in an embodiment in which semantic category or categories 356 are employed (e.g., because there is more than one category, all categories are not automatically employed for semantic analysis, and standard or default values for semantic category or categories to be analyzed 370 are not automatically entered), because such replacement of function(s) by semantic analyzer 320 may moreover be carried out only with respect to semantic category or categories to be analyzed 370 as entered or otherwise designated, e.g., interactively via a user interface at input/output unit 337 of computer 330, at step 315 (or at step 215, in an embodiment in which instructions causing PDL interpreter 390 or other suitable component at printer 310 to carry out semantic analysis are passed to the PDL interpreter 390 or other suitable component at printer 310 via PDL or other suitable instructions contained in a print job created by printer driver 210), such semantic analysis may in such embodiments moreover be carried out in correspondence to semantic category or categories to be analyzed 370 as designated at step 315 (or at step 215).

Thus, in an embodiment in which categories are employed, semantic analyzer 320 might only recognize semantic pattern(s) 352 that are associated with semantic category or categories to be analyzed 370 as entered or otherwise designated at step 315 (or at step 215), and might ignore (i.e., not perform operation(s) defined by rule(s) 354 associated with) semantic pattern(s) 352 that do not belong to, i.e., are not associated with, such semantic category or categories to be analyzed 370.

At step 319 in the flowchart shown in FIG. 12, the analyzed print data 374 and/or report 376 that is produced when semantic analyzer 320 carries out operation(s) defined by rule(s) 354 at step 317 may be output by way of a printer, display, or other such output device of a user interface at input/output unit 337 of computer 330 and/or at a remote location via communication interface 336, and/or may be output in the form of a file which might be sent to a remote location via communication interface 336 and/or stored at data storage 332 and/or stored via a USB thumb drive or other such removable storage device which might, for example, be inserted into a removable storage interface at data storage 332 or input/output unit 337 of computer 330.

In the present embodiment, in addition to and/or in conjunction with the semantic analysis that is carried out at step 317 in the flowchart shown in FIG. 12, parsing, filtering, and/or other such processing of print data by PDL interpreter 390 may cause unanalyzed print data 372 to be converted such that analyzed print data 374 is in a format different from that of unanalyzed print data 372. That is, in the present embodiment, in addition to and/or in conjunction with the semantic analysis carried out at step 317, PDL interpreter 390 of printer 310 may cause unanalyzed print data 372 to be converted to raster image format.

Referring to FIGS. 13A through 13C, these show an example of print data that might be subjected to semantic analysis by semantic analyzer 120, 220, 320, the unanalyzed print data 172, 272, 372 shown in FIGS. 13A through 13C being an example of print data in the form of XPS print data such as might be used in one or more embodiments for printing of the document shown in FIG. 5.

At FIGS. 13A through 13C, note that the text of the document shown in FIG. 5 is not encoded but at least some locations therein would be intelligible if opened and read by a human being. At FIGS. 13A through 13C, instances of text described with reference to the example shown in FIG. 6 as having been previously stored at database 150 as semantic patterns 152 associated with the category "Confidential", i.e., instances of text shown as being obscured by a solid black field in FIG. 6, have been printed in bold font at FIGS. 13A through 13C for ease of identification. In accordance with an embodiment of the invention, semantic analyzer 320 and/or PDL interpreter 390 at printer 310 of print data semantic analysis system 300 shown in FIG. 11 might use the content shown in FIGS. 13A through 13C as unanalyzed print data 372 to carry out semantic analysis in accordance with a procedure as described with reference to the flowchart of FIG. 12 to produce analyzed print data 374 as shown in FIG. 6 or 7 and/or a report as shown in FIG. 8.

Figure 14:
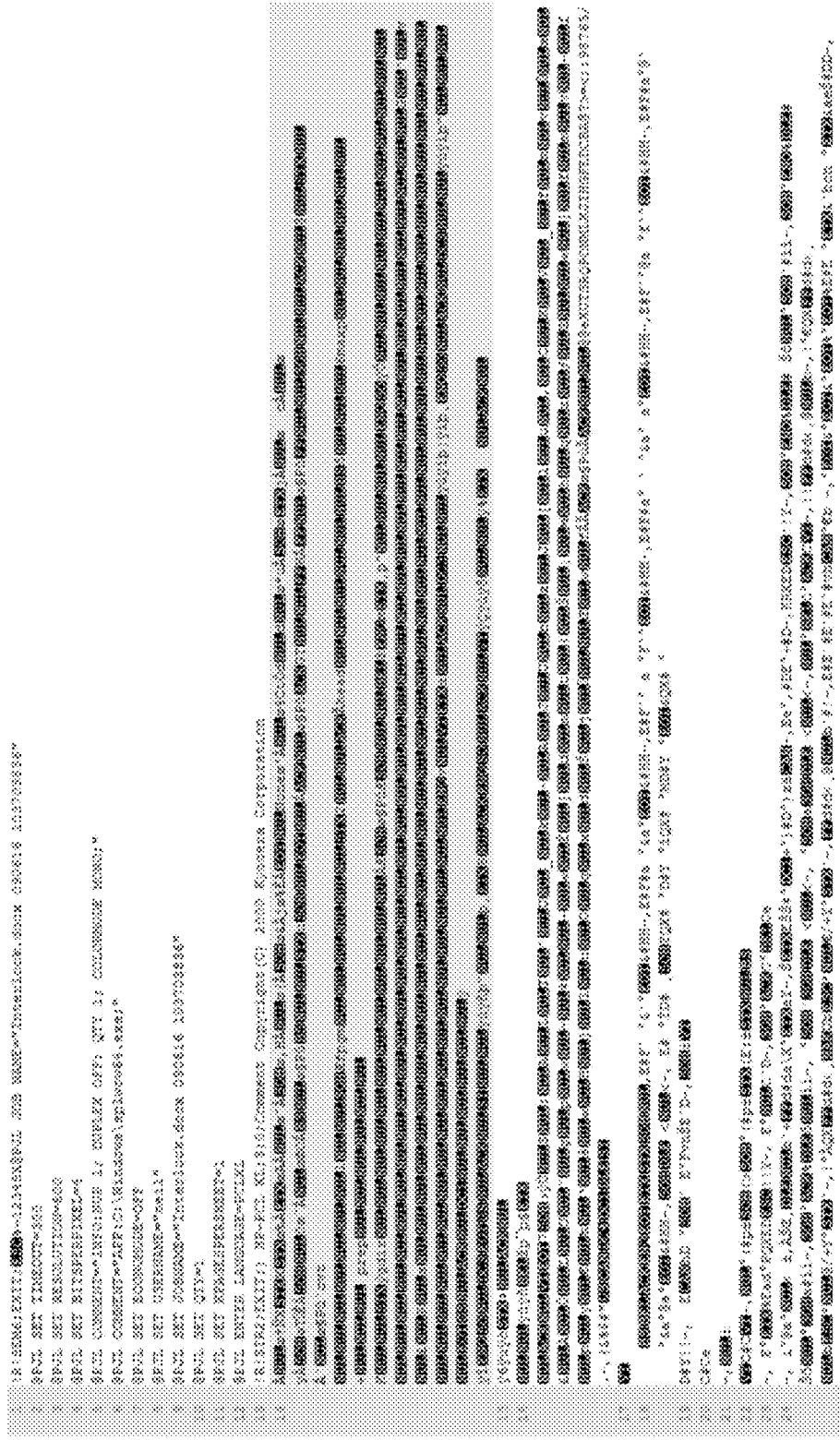
FIG. 14 shows an example of print data that might be subjected to semantic analysis by semantic analyzer 120, 220, 320, the unanalyzed print data 172, 272, 372 shown in FIG. 14 being an excerpt of print data in the form of encoded PCL XL instructions such as might be used in one or more embodiments for printing of the document shown in FIG. 5.

Referring to FIG. 14, this shows an example of print data that might be subjected to semantic analysis by semantic analyzer 120, 220, 320, the unanalyzed print data 172, 272, 372 shown in FIG. 14 being an excerpt of print data in the form of encoded PCL XL instructions such as might be used in one or more embodiments for printing of the document shown in FIG. 5. FIGS. 15A and 15B show content of print instructions such as might be obtained when the encoded PCL XL instructions shown in FIG. 14 are decoded.

At FIG. 14, note that text appearing in the document shown in FIG. 5 has been encoded and would generally be unintelligible even if the file were opened and attempted to be read by a human being. Use of print data which is encoded or otherwise unintelligible when opened by a human being might be preferred so as to prevent unauthorized users from accessing print data or from thwarting censoring or other such semantic analysis of that print data.

The encoded data shown in FIG. 14 may be decoded to produce at least partially humanly intelligible text such as is shown in FIGS. 15A and 15B. In accordance with an embodiment of the invention, semantic analyzer 320 and/or PDL interpreter 390 at printer 310 of print data semantic analysis system 300 shown in FIG. 11 might decode or otherwise parse unanalyzed print data 372 in the form of the encoded data shown in FIG. 14 to carry out semantic analysis in accordance with a procedure as described with reference to the flowchart of FIG. 12 to produce analyzed print data 374 as shown in FIG. 6 or 7 and/or a report as shown in FIG. 8.

Figure 16:
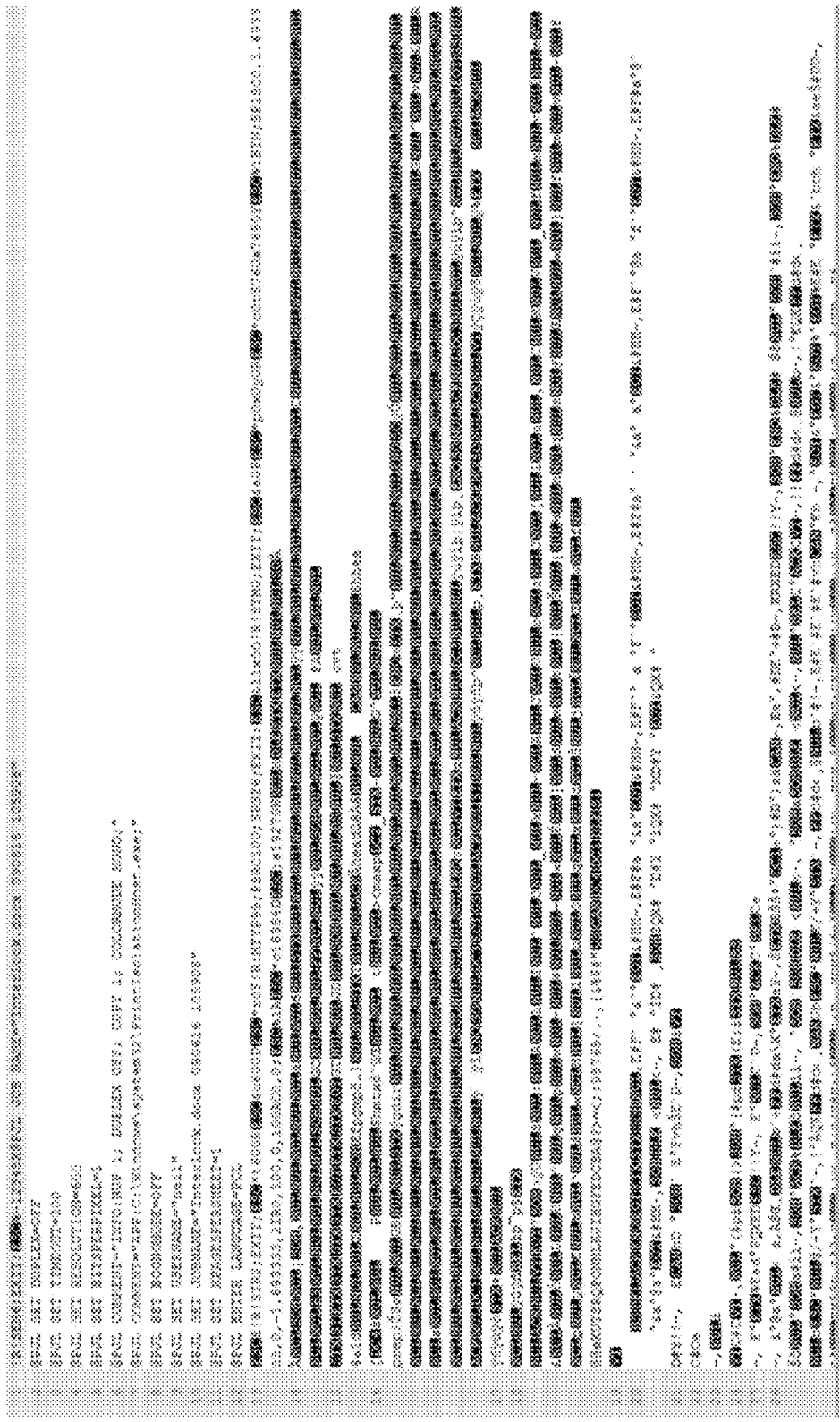
FIG. 16 shows an example of print data that might be subjected to semantic analysis by semantic analyzer 120, 220, 320, the unanalyzed print data 172, 272, 372 shown in FIG. 16 being an excerpt of print data in the form of encoded PCL 5 instructions such as might be used in one or more embodiments for printing of the document shown in FIG. 5.

Referring to FIG. 16, this shows an example of print data that might be subjected to semantic analysis by semantic analyzer 120, 220, 320, the unanalyzed print data 172, 272, 372 shown in FIG. 16 being an excerpt of print data in the form of encoded PCL 5 instructions such as might be used in one or more embodiments for printing of the document shown in FIG. 5. FIGS. 17A and 17B show content of print instructions such as might be obtained when the encoded PCL 5 instructions shown in FIG. 16 are decoded.

At FIG. 16, note that text appearing in the document shown in FIG. 5 has been encoded and would generally be unintelligible even if the file were opened and attempted to be read by a human being. Use of print data which is encoded or otherwise unintelligible when opened by a human being might be preferred so as to prevent unauthorized users from accessing print data or from thwarting censoring or other such semantic analysis of that print data.

The encoded data shown in FIG. 16 may be decoded to produce at least partially humanly intelligible text such as is shown in FIGS. 17A and 17B. In accordance with an embodiment of the invention, semantic analyzer 320 and/or PDL interpreter 390 at printer 310 of print data semantic analysis system 300 shown in FIG. 11 might decode or otherwise parse unanalyzed print data 372 in the form of the encoded data shown in FIG. 16 to carry out semantic analysis in accordance with a procedure as described with reference to the flowchart of FIG. 12 to produce analyzed print data 374 as shown in FIG. 6 or 7 and/or a report as shown in FIG. 8.

Figure 18:
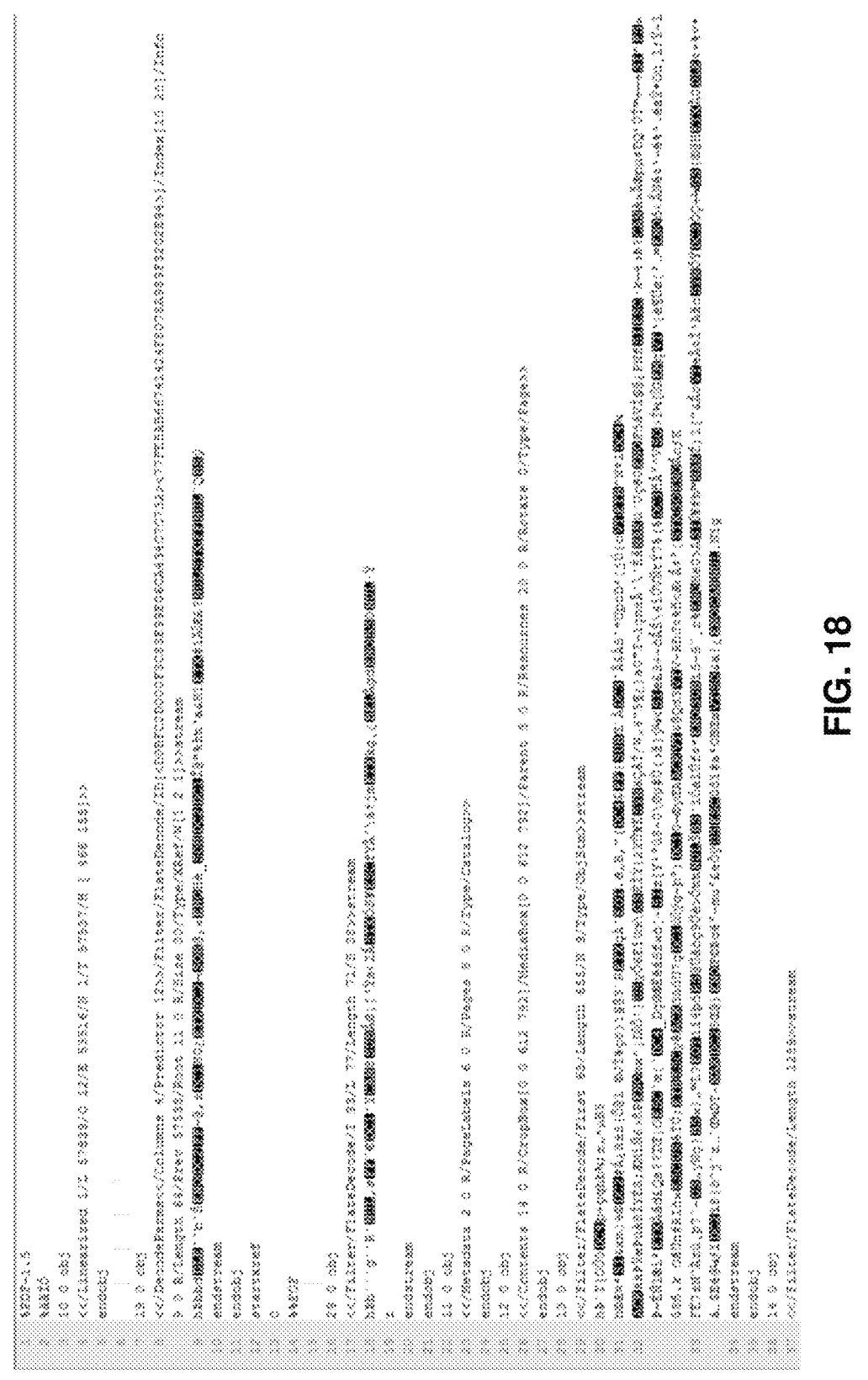

Referring to FIG. 18, this shows an example of print data that might be subjected to semantic analysis by semantic analyzer 120, 220, 320, the unanalyzed print data 172, 272, 372 shown in FIG. 18 being an excerpt of print data in the form of a PDF print job such as might be used in one or more embodiments for printing of the document shown in FIG. 5.

At FIG. 18, note that text appearing in the document shown in FIG. 5 has been encoded and would generally be unintelligible even if the file were opened and attempted to be read by a human being. Use of print data which is encoded or otherwise unintelligible when opened by a human being might be preferred so as to prevent unauthorized users from accessing print data or from thwarting censoring or other such semantic analysis of that print data.

The PDF file encoded content shown in FIG. 18 includes objects, some of which will in general be for text and some of which will in general be for images. As described above with reference to FIG. 6, during semantic analysis of unanalyzed print data 172, 272, 372, semantic analyzer 120, 220, 320 may recognize semantic pattern(s) 152, 272, 372 corresponding to text and/or image(s). In accordance with an embodiment of the invention, semantic analyzer 320 and/or PDL interpreter 390 at printer 310 of print data semantic analysis system 300 shown in FIG. 11 might decode or otherwise parse unanalyzed print data 372 in the form of the encoded data shown in FIG. 16 to carry out semantic analysis in accordance with a procedure as described with reference to the flowchart of FIG. 12 to produce analyzed print data 374 as shown in FIG. 6 or 7 and/or a report as shown in FIG. 8.

Referring to FIGS. 19A through 19C, these show an example of print data that might be subjected to semantic analysis by semantic analyzer 120, 220, 320, the unanalyzed print data 172, 272, 372 shown in FIGS. 19A through 19C being an example of print data in the form of a KPDL or PostScript print job such as might be used in one or more embodiments for printing of the document shown in FIG. 5.

At FIGS. 19A through 19C, note that there are some locations in the document shown in FIG. 5 that would be partially but not fully intelligible if opened and read by a human being. For example, the PostScript "xshow" command is intelligible, this being a command for showing text strings. In accordance with an embodiment of the invention, semantic analyzer 320 and/or PDL interpreter 390 at printer 310 of print data semantic analysis system 300 shown in FIG. 11 might use the content shown in FIGS. 19A through 19C as unanalyzed print data 372 to carry out semantic analysis in accordance with a procedure as described with reference to the flowchart of FIG. 12 to produce analyzed print data 374 as shown in FIG. 6 or 7 and/or a report as shown in FIG. 8.

The foregoing are just a few examples of the many types of unanalyzed print data 172, 272, 372 that may be subjected to semantic analysis in accordance with embodiments of the present invention. For example, when semantic analyzer 320 and/or PDL interpreter 390 at printer 310 of print data semantic analysis system 300 shown in FIG. 11 is used to carry out semantic analysis, semantic analyzer 320 and/or PDL interpreter 390 might perform decoding, translation, and/or other processing as necessary. Although the descriptions given above with respect to FIGS. 13A through 19C primarily concern semantic patterns 152, 252, 352 in the form of text, in some embodiments semantic analysis may alternatively or additionally be carried out with respect to semantic patterns 152, 252, 352 in the form of images, filenames, links, print job parameters, and/or other embedded data, as has been mentioned with reference to FIGS. 4 and 6.

As described above, where a page description language is encoded or is otherwise not humanly intelligible, this may be preferred for prevention of unauthorized access to unanalyzed print data or prevention of thwarting by users of censoring or other such semantic analysis of that print data. Where this is the case, unanalyzed print data 172, 272, 372 might be decoded or otherwise parsed by semantic analyzer 320 and/or PDL interpreter 390 before semantic patterns 152, 252, 352 could be identified therein. Similarly, patterns in which order of letters, words, or other such symbols is reversed, or diagonal patterns and the like, or text in images and so forth may not be discernible until after extraction and/or other processing is carried out. At such time, any of various methods including buffering, look-up tables, optical character recognition, and/or other image processing algorithms may be employed as appropriate.

In some embodiments, it may be convenient to define or modify semantic pattern(s) 152, rule(s) 154, and/or semantic category or categories 156 at database 150 through employment of print job parameters such as @PJL instruction(s), XPS print data and/or ticket content, PostScript command(s), and/or user-defined function(s) that might be added to and/or incorporated in unanalyzed print data 172. That is, in some embodiments, the unanalyzed print data 172 itself may contain all or any portion of the semantic pattern(s) 152, rule(s) 154, and/or semantic category or categories 156 of database 150 based on which semantic analysis of that unanalyzed print data 172 is to be carried out.

Note that while FIGS. 13A through 19C have been described in terms of examples in which semantic analyzer 320 and/or PDL interpreter 390 at printer 310 of print data semantic analysis system 300 shown in FIG. 11 uses unanalyzed print data 372 to carry out semantic analysis in accordance with a procedure as described with reference to the flowchart of FIG. 12 to produce analyzed print data 374 as shown in FIG. 6 or 7 and/or a report as shown in FIG. 8, similar effect can be achieved when semantic analyzer 220 and/or PDL generator 290 at printer driver 210 of print data semantic analysis system 200 shown in FIG. 9 uses unanalyzed print data 272 to carry out semantic analysis in accordance with a procedure as described with reference to the flowchart of FIG. 10 to produce analyzed print data 274 as shown in FIG. 6 or 7 and/or a report as shown in FIG. 8.

While embodiments of the present invention have been described above, modes of carrying out the present invention are not limited to the foregoing embodiments, a great many further variations being possible without departing from the gist of the present invention. Where a single computer has been shown and/or described for implementation of some of the various functionalities herein, there is no objection to distributed processing in which a plurality of computers are employed for implementation of such functionalities. For any of the various function(s) described with reference to one or more of the flowcharts in the attached drawings, so long as it would not interfere with ability to carry out the function(s) in question, the order of steps may be different from that described herein.

What is claimed is:
1. A print data handler comprising:
a computer; and
a semantic analyzer having a semantic identifier and a semantic operator;
wherein the semantic analyzer is communicatively connected to a database within which at least one semantic pattern is stored in association with at least one rule;
wherein, during processing of print data by the print data handler, the semantic analyzer carries out semantic analysis of the print data by
causing the semantic identifier to recognize the at least one semantic pattern in the print data, and
causing the semantic operator to carry out at least one operation according to the at least one rule in correspondence to the at least one semantic pattern when the semantic identifier recognizes the at least one semantic pattern in the print data;
wherein the print data is encoded so as to be at least partially unintelligible to a human being; and
wherein the at least one operation carried out by the semantic analyzer includes replacement of the at least one semantic pattern in the print data.
2. The print data handler according to claim 1 wherein
at least one category is further stored in association with the at least one semantic pattern within the database; and
during processing of print data by the print data handler, the semantic analyzer is further capable of carrying out the semantic analysis of the print data in correspondence to the at least one category when the semantic analyzer recognizes the at least one semantic pattern in the print data.
3. The print data handler according to claim 1 wherein the print data handler is a printer driver capable of creating a print job.
4. The print data handler according to claim 3 wherein the printer driver has a page description language generator.
5. The print data handler according to claim 4 wherein the semantic analyzer is capable of carrying out the semantic analysis of the print data in conjunction with parsing of the print data by the page description language generator.
6. The print data handler according to claim 5 wherein the database is a function table; and
during creation of the print job by the printer driver, the semantic analyzer is capable of causing the page description language generator to employ at least one function stored at the function table in correspondence to the at least one semantic pattern when the semantic analyzer recognizes the at least one semantic pattern in the print data.
7. The print data handler according to claim 1 wherein, during processing of print data by the print data handler, the semantic identifier recognizes not only at least one perfect match but also at least one near-match of the at least one semantic pattern in the print data.
8. The print data handler according to claim 1 wherein the at least one operation carried out by the semantic analyzer further includes counting of a number of occurrences of the at least one semantic pattern in the print data.
9. The print data handler according to claim 1 wherein at least a portion of the database is present within the print data.
10. The print data handler according to claim 1 wherein the at least one operation carried out by the semantic analyzer further includes at least one species selected from among the group consisting of colored highlighting of the at least one semantic pattern in the print data, application of at least one hatch pattern to the at least one semantic pattern in the print data, blurring of the at least one semantic pattern in the print data, striking of the at least one semantic pattern in the print data, crossing out of the at least one semantic pattern in the print data, blackening of the at least one semantic pattern in the print data, and obscuring of the at least one semantic pattern in the print data.

11. The print data handler according to claim 1 wherein the print data handler is a printer capable of creating a raster image.

12. The print data handler according to claim 11 wherein the printer has a page description language interpreter.

13. The print data handler according to claim 12 wherein the semantic analyzer is capable of carrying out the semantic analysis of the print data in conjunction with parsing of the print data by the page description language interpreter.

14. The print data handler according to claim 13 wherein the database is a function table; and
during creation of the raster image by the printer, the semantic analyzer is capable of causing the page description language interpreter to employ at least one function stored at the function table in correspondence to the at least one semantic pattern when the semantic analyzer recognizes the at least one semantic pattern in the print data.

15. The print data handler according to claim 11
wherein the printer is a multifunction peripheral that also includes functionality of at least one species selected from among the group consisting of image scanner, facsimile machine, copy machine, and document storage device.

16. The print data handler according to claim 11 wherein the printer is a raster image processor.

17. The print data handler according to claim 11 wherein the printer is a print server.

18. A print data semantic analysis system comprising:
a print data handler including
  a computer and
  a semantic analyzer; and
a database communicatively connected to the print data handler and within which at least one semantic pattern is stored in association with at least one rule;
wherein, during processing of print data by the print data handler, the semantic analyzer carries out semantic analysis of the print data by
  recognizing the at least one semantic pattern in the print data, and
  carrying out at least one operation according to the at least one rule in correspondence to the at least one semantic pattern when the semantic analyzer recognizes the at least one semantic pattern in the print data;
wherein the print data is encoded so as to be at least partially unintelligible to a human being; and
wherein the at least one operation carried out by the semantic analyzer includes replacement of the at least one semantic pattern in the print data.

19. The print data semantic analysis system according to claim 18 comprising a first print data handler and a second print data handler,
the first print data handler being a printer driver capable of creating a print job; and
the second print data handler being a printer capable of creating a raster image.

20. A print data semantic analysis method comprising:
carrying out semantic analysis of print data by causing a print data handler including a computer and a semantic analyzer to
  recognize at least one semantic pattern in the print data, and
  carry out at least one operation according to at least one rule in correspondence to the at least one semantic pattern when the at least one semantic pattern is recognized in the print data;
wherein communicatively connected to the print data handler is a database within which the at least one semantic pattern is stored in association with the at least one rule;
wherein the print data is encoded so as to be at least partially unintelligible to a human being; and
wherein the at least one operation carried out by the semantic analyzer includes replacement of the at least one semantic pattern in the print data.

* * * * *